US011159693B2

(12) United States Patent
Kawataki et al.

(10) Patent No.: US 11,159,693 B2
(45) Date of Patent: Oct. 26, 2021

(54) ELECTRONIC APPARATUS

(71) Applicant: SONY CORPORATION, Tokyo (JP)

(72) Inventors: Hideo Kawataki, Kanagawa (JP);
Jumpei Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 112 days.

(21) Appl. No.: 16/485,684

(22) PCT Filed: Jan. 12, 2018

(86) PCT No.: PCT/JP2018/000651
§ 371 (c)(1),
(2) Date: Oct. 25, 2019

(87) PCT Pub. No.: WO2018/159113
PCT Pub. Date: Sep. 7, 2018

(65) Prior Publication Data
US 2020/0137253 A1  Apr. 30, 2020

(30) Foreign Application Priority Data
Mar. 3, 2017  (JP) .............................. JP2017-040686

(51) Int. Cl.
*H04N 1/00* (2006.01)
*H04N 5/225* (2006.01)

(52) U.S. Cl.
CPC ..... *H04N 1/00901* (2013.01); *H04N 1/00893* (2013.01); *H04N 5/2251* (2013.01)

(58) Field of Classification Search
CPC ........... H04N 1/00901; H04N 1/00893; H04N 5/2251; Y02T 10/62; H02J 7/00; H02J 7/02; G03B 17/00; G03B 17/02; G03B 17/56
See application file for complete search history.

(56) References Cited

U.S. PATENT DOCUMENTS

| 6,160,377 A | 12/2000 | Fujii | |
|---|---|---|---|
| 6,873,367 B1 | 3/2005 | Hirata et al. | |
| 2001/0005124 A1* | 6/2001 | Odeohhara | ........... H02J 7/0022 320/116 |
| 2003/0147637 A1 | 8/2003 | Sasagawa | |

(Continued)

FOREIGN PATENT DOCUMENTS

| CN | 1230043 A | 9/1999 |
|---|---|---|
| CN | 1435724 A | 8/2003 |

(Continued)

OTHER PUBLICATIONS

International Search Report and Written Opinion of PCT Application No. PCT/JP2018/000651, dated Mar. 20, 2018, 13 pages of ISRWO.

*Primary Examiner* — Nhan T Tran
(74) *Attorney, Agent, or Firm* — Chip Law Group

(57) ABSTRACT

The purpose of the present invention is to reduce the number of components of an external device to reduce the cost of the external device. The electronic device according to the present technique is provided with: a battery installed unit in which a secondary battery is installed; a charging unit for charging the secondary battery on the basis of an external input power; and a connection unit for electrically connecting an external device in which a secondary battery is installed. The secondary battery installed in the external device is charged by means of the charging unit via the connection unit.

17 Claims, 13 Drawing Sheets

(56) References Cited

U.S. PATENT DOCUMENTS

| | | | | |
|---|---|---|---|---|
| 2004/0190047 A1* | 9/2004 | Ito | ............... | H04N 1/00901 |
| | | | | 358/1.15 |
| 2008/0180549 A1* | 7/2008 | Lee | ............... | G03B 19/26 |
| | | | | 348/231.2 |
| 2008/0315840 A1* | 12/2008 | Mori | ............... | H04N 5/23241 |
| | | | | 320/136 |
| 2009/0061295 A1* | 3/2009 | Matsumoto | ............... | H01M 50/209 |
| | | | | 429/99 |
| 2013/0113417 A1* | 5/2013 | Nakashima | ............... | H02J 7/0019 |
| | | | | 320/107 |
| 2017/0201108 A1* | 7/2017 | You | ............... | H01F 7/0252 |

FOREIGN PATENT DOCUMENTS

| | | | | |
|---|---|---|---|---|
| CN | 101382723 A | 3/2009 | | |
| CN | 103107568 A | 5/2013 | | |
| DE | 69834611 T2 | 10/2006 | | |
| EP | 0911939 A2 | 4/1999 | | |
| JP | 05-045682 U | 6/1993 | | |
| JP | 07-201369 A | 8/1995 | | |
| JP | 11-191933 A | 7/1999 | | |
| JP | 2000-350073 A | 12/2000 | | |
| JP | 2003-228116 A | 8/2003 | | |
| JP | 4068275 B2 | 3/2008 | | |
| JP | 2009-058921 A | 3/2009 | | |
| JP | 2010-119244 A | 5/2010 | | |
| JP | 2010119244 A | * 5/2010 | ............ | H01M 10/44 |
| JP | 2010-243634 A | 10/2010 | | |
| JP | 2011-155755 A | 8/2011 | | |
| JP | 2013-102625 A | 5/2013 | | |
| JP | 2015-126474 A | 7/2015 | | |
| KR | 100749108 B1 | 8/2007 | | |
| TW | 200302951 A | 8/2003 | | |

\* cited by examiner

ELECTRONIC APPARATUS

CROSS REFERENCE TO RELATED APPLICATIONS

This application is a U.S. National Phase of International Patent Application No. PCT/JP2018/000651 filed on Jan. 12, 2018, which claims priority benefit of Japanese Patent Application No. JP 2017-040686 filed in the Japan Patent Office on Mar. 3, 2017. Each of the above-referenced applications is hereby incorporated herein by reference in its entirety.

TECHNICAL FIELD

For example, the present technology relates to an electronic apparatus such as an imaging apparatus including a battery mounting unit in which a secondary battery is mounted, and a charging unit that charges the secondary battery on the basis of external input power. In addition, the present technology relates to an electronic apparatus including a battery mounting unit in which the secondary battery is mounted, and a connection unit that is electrically connected to an imaging apparatus in which the secondary battery is mounted.

BACKGROUND ART

For example, an external device in which a secondary battery can be mounted may be connected to a battery-driven electronic apparatus such as an imaging apparatus for battery capacity expansion and the like. As an example of the external device, an extension grip type external device with respect to the imaging apparatus can be exemplified.

The external device can mount a secondary battery having a battery capacity greater than that of a secondary battery mounted in the electronic apparatus, or can mount a plurality of secondary batteries therein, and thus battery capacity extension of the electronic apparatus is realized.

In the related art, charging of the secondary battery that is mounted in the external device is performed by a charging unit that is mounted in the external device.

Note that, with regard to the related art, for example, the following Patent Literatures can be exemplified.

CITATION LIST

Patent Literature

Patent Literature 1: Japanese Patent Application Laid-open No. 2015-126474
Patent Literature 2: Japanese Patent Application Laid-open No. 2010-243634

DISCLOSURE OF INVENTION

Technical Problem

However, when mounting the charging unit in the external device, an increase in the number of parts of the external device is caused, and this leads to an increase in the cost.

The present technology has been made in consideration of such circumstances, and an object thereof is to reduce the number of parts of the external device, and to reduce the cost of the external device.

Solution to Problem

According to an aspect of the present technology, there is provided a first electronic apparatus including: a battery mounting unit in which a secondary battery is mounted; a charging unit that charges the secondary battery on the basis of external input power; and a connection unit that establishes electrical connection of an external device in which a secondary battery is mounted. The secondary battery mounted in the external device is charged by the charging unit through the connection unit.

According to this, when charging the secondary battery of the external device, it is not necessary to provide a charging unit in the external device.

It is desirable that the first electronic apparatus according to the present technology further includes a power receiving unit that receives power supply from the secondary battery mounted in the external device.

According to this, the electronic apparatus can operate on the basis of the secondary battery mounted in the external device.

In the first electronic apparatus according to the present technology, it is desirable that charging is performed with respect to the secondary battery mounted in the external device to be attachable and detachable by a user.

When the secondary battery is attachable and detachable, even in a case where a residual amount of a secondary battery that is being used does not exist, it is possible to continuously use the electronic apparatus by substituting the secondary battery with a charged secondary battery.

In the first electronic apparatus according to the present technology, it is desirable that the external device is capable of mounting a plurality of the secondary batteries therein, and charging is performed with respect to the plurality of secondary batteries by the charging unit.

According to this, at least two or more batteries can be used in a driving of the electronic apparatus.

In the first electronic apparatus according to the present technology, it is desirable that the secondary battery mounted in the battery mounting unit and the secondary battery mounted in the external device are selectively charged by the charging unit.

According to this, it is possible to distinguish charging of the secondary battery on the electronic apparatus side and charging of the secondary battery on the external device side by a common charging unit that is provided on the electronic apparatus side.

In the first electronic apparatus according to the present technology, each of the battery mounting unit and the external device is capable of mounting the secondary battery therein in an attachable and detachable manner, and the battery mounting unit is capable of mounting a secondary battery according to the same shape and the same size as in the secondary battery mounted in the external device.

According to this, it is possible to realize an improvement of the degree of freedom in a battery use pattern, such as a pattern in which the secondary battery mounted in the external device is used in the electronic apparatus and a pattern in which the secondary battery mounted in the electronic apparatus is used in a state of being mounted in the external device.

In the first electronic apparatus according to the present technology, the electronic apparatus is set as an imaging apparatus from which the external device that functions as an extension grip is attachable and detachable.

According to this, the extension grip can be used as an external battery of the imaging apparatus.

It is desirable that the first electronic apparatus according to the present technology further includes a charging control unit that controls a charging operation of the secondary battery by the charging unit, and the charging control unit performs an authentication process relating to the secondary battery, and controls the charging operation on the basis of a result of the authentication process.

According to this, it is possible to prevent a secondary battery other than a specific secondary battery (for example, an irregular product) from being used.

It is desirable that the first electronic apparatus according to the present technology further includes a charging control unit that controls a charging operation of the secondary battery by the charging unit, and in a case where a plurality of the secondary batteries exists as a charging target, the charging control unit causes the charging unit to execute charging preferentially from a secondary battery of which a charging rate is low.

According to this, it is possible to perform charging sequentially from a secondary battery of which a charging rate is low, that is, a secondary battery of which charging efficiency (charging amount per unit time) is assumed to be higher.

It is desirable that the first electronic apparatus according to the present technology further includes a charging control unit that controls a charging operation of the secondary battery by the charging unit, and in a case where a plurality of the secondary batteries of which a charging rate is less than a predetermined charging rate less than full charging exists as a charging target secondary battery, in correspondence with charging of one secondary battery up to the predetermined charging rate, the charging control unit suspends charging of the secondary battery, and charges another secondary battery up to the predetermined charging rate.

Typically, in a secondary battery, charging efficiency is lowered in a charging rate region up to full charging exceeding a predetermined charging rate. That is, a long charging time is taken in the charging rate region up to the full charging exceeding the predetermined charging rate. According to the above-described configuration, it is possible to consume a relatively long time necessary for charging in the charging rate region up to the full charging as a charging time up to a predetermined charging rate in another secondary battery, that is, as a charging time of a charging rate region with high charging efficiency.

In the first electronic apparatus according to the present technology, it is desirable that the charging control unit initiates charging of the one secondary battery, in which charging is suspended, up to the full charging under a condition in which the charging rate of the other secondary battery becomes equal to or greater than the predetermined charging rate.

According to this, in the case of having a time margin, charging up to the full charging is performed.

It is desirable that the first electronic apparatus according to the present technology further includes a display unit that performs display with respect to information indicating a charging operation state of the charging unit.

According to this, it is not necessary to provide a display unit for showing the charging operation state to a user in the external device.

In the first electronic apparatus according to the present technology, it is desirable that the display unit includes a lighting tool, and the display control unit makes a lighting pattern of the lighting tool be different in correspondence with a type of the secondary battery that is being charging by the charging unit.

According to this, when distinguishing display in a manner that depends on the type of the secondary batteries as charging destinations, it is not necessary to provide a plurality of the lighting tools.

In the first electronic apparatus according to the present technology, it is desirable that the display control unit makes the number of continuous flickers of a lighting pattern according to a first lighting time length of the lighting tool be different in correspondence with whether the secondary battery that is being charged by the charging unit is the secondary battery mounted in the battery mounting unit or the secondary battery mounted in the external device.

According to this, when distinguishing display of the secondary batteries as charging destinations between the electronic apparatus side and the external device side, it is not necessary to provide a plurality of the lighting tools.

In the first electronic apparatus according to the present technology, it is desirable that any one of the battery mounting unit and the external device is capable of mounting a plurality of the secondary batteries therein, and the display control unit makes the number of continuous flickers of a lighting pattern according to a second lighting time length of the lighting tool be different in correspondence with which of the plurality of secondary batteries is the secondary battery that is being charged by the charging unit.

According to this, in a case where any one of the electronic apparatus and the external device is capable of mounting the plurality of secondary batteries therein, when distinguishing display to indicate which secondary battery is being charged among the plurality of secondary batteries, it is not necessary to provide a plurality of lighting tools.

In the first electronic apparatus according to the present technology, it is desirable that the connection unit establishes electrical connection of the external device by a terminal common to the secondary battery mounted in the battery mounting unit.

According to this, it is not necessary to provide a configuration for switching the secondary battery as a charging destination in the electronic apparatus.

In the first electronic apparatus according to the present technology, it is desirable that the connection unit includes terminals for charging of the secondary battery mounted in the external device, and the terminals for charging are set as a terminal different from a terminal for charging of the secondary battery mounted in the battery mounting unit.

According to this, it is not necessary to provide a configuration for switching the secondary battery as a charging destination in the external device.

In addition, it is not necessary to remove the secondary battery from the battery mounting unit when connecting the external device to the electronic apparatus.

In the first electronic apparatus according to the present technology, it is desirable that operation information of an operator provided in the external device is received through the connection unit.

According to this, a user can operate the electronic apparatus by the operator provided in the external device.

According to a second aspect of the present technology, there is a second electronic apparatus including: a battery mounting unit in which a secondary battery is mounted; and a connection unit that is electrically connected to an imaging apparatus in which the secondary battery is mounted. The secondary battery mounted in the battery mounting unit is charged by a charging unit that is provided in the imaging apparatus and charges a secondary battery on the basis of external input power through the connection unit.

According to the second electronic apparatus, a similar operation as in the first electronic apparatus is obtained.

Advantageous Effects of Invention

According to the present technology, it is possible to realize a reduction in the number of parts of the external device, and it is possible to realize a reduction in the cost of the external device.

Note that, the effect described here is not limited, and may be any one effect described in this specification.

MODE(S) FOR CARRYING OUT THE INVENTION

Hereinafter, embodiments according to the present technology will be described in the following order with reference to the accompanying drawings.
<1. First Embodiment>
[1-1. Configuration of Charging System]
[1-2. Process Procedure]
<2. Second Embodiment>>
[2-1. Configuration of Charging System]
[2-2. Process Procedure]
<3. Third Embodiment>
<4. Display Example of Charging Destination Battery>
<5. Summary of Embodiments>
<6. Modification Example>
<7. Application Example>
[7-1. First Application Example]
[7-2. Second Application Example]
<8. Present Technology>

1. First Embodiment

[1-1. Configuration Charging System]

Figure 1:
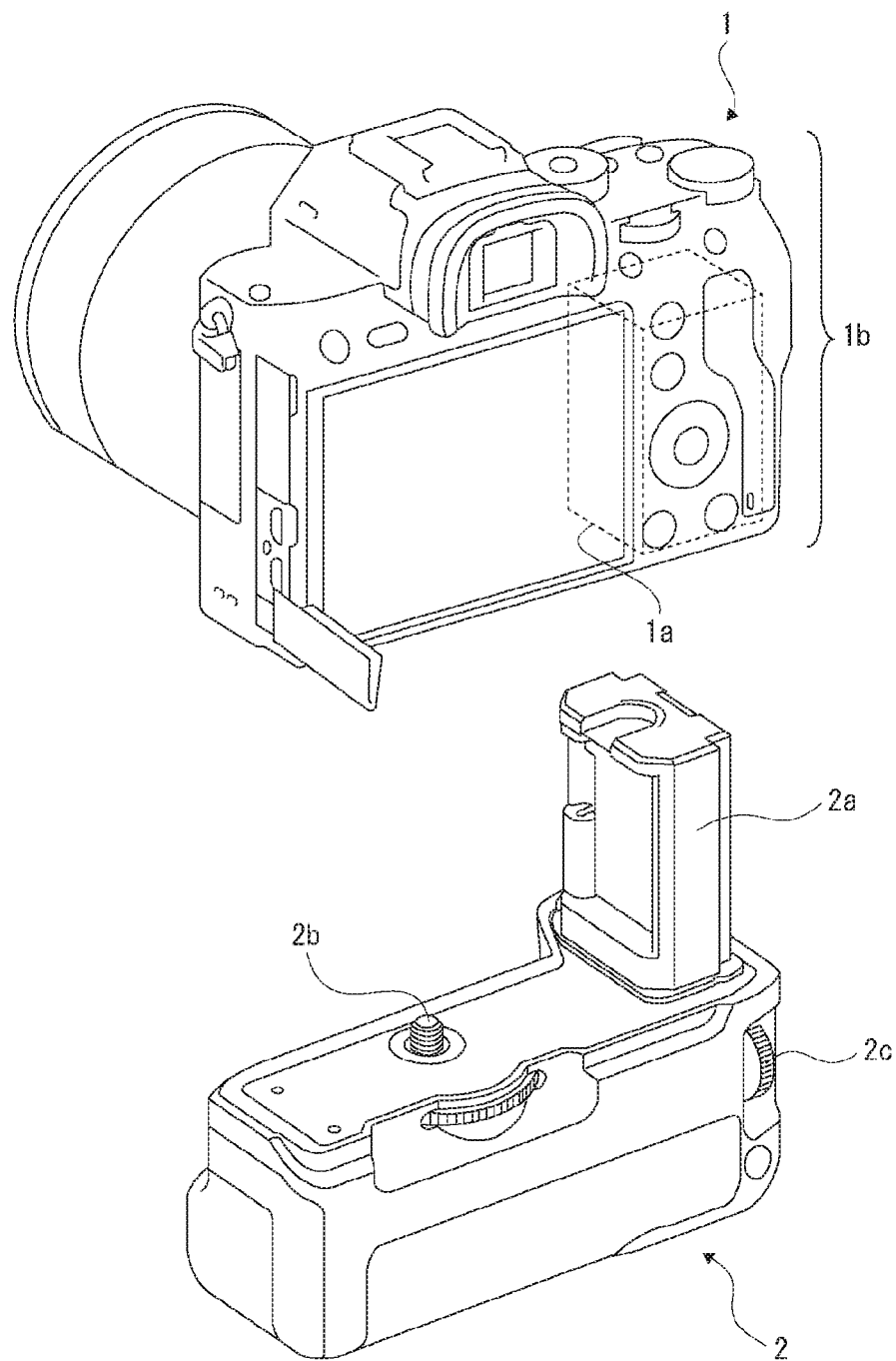
FIG. 1 is a schematic perspective view for describing an external appearance configuration of a charging system provided with an electronic apparatus as a first embodiment according to the present technology.

FIG. 1 is a schematic perspective view for describing an external appearance configuration of a charging system provided with an electronic apparatus 1 as a first embodiment according to the present technology.

For example, the charging system according to this embodiment includes an electronic apparatus 1 that is configured as an imaging apparatus such as a digital camera apparatus, and an external device 2 capable of supplying power to the electronic apparatus 1.

For example, the electronic apparatus 1 is configured as a lens-exchange type mirrorless single-lens type digital camera apparatus, and includes, for example, an imaging element (not illustrated) such as a charge coupled device (CCD) sensor and a complementary metal-oxide semiconductor (CMOS) sensor on an inner side. FIG. 1 illustrates the electronic apparatus 1 in a state in which an exchange lens is attached thereto.

A battery mounting unit 1$a$, in which a secondary battery 3A (not illustrated in FIG. 1) with a predetermined shape and a predetermined size can be mounted, is mounted in the electronic apparatus 1. The secondary battery 3A is mounted in the battery mounting unit 1$a$ to be attachable and detachable by a user.

A grip portion 1$b$ as a portion gripped by a user is formed in the electronic apparatus 1, and the battery mounting unit 1$a$ is located inside the grip portion 1$b$.

Two pieces of secondary batteries including a secondary battery 3B and a secondary battery 3C (not illustrated in FIG. 1) can be mounted inside the external device 2, and the external device 2 performs power supply with respect to the electronic apparatus 1 with the secondary batteries 3B and 3C set as a power source. The secondary batteries 3B and 3C are mounted in the external device 2 to be attachable and detachable by a user.

Note that, the external device 2 is provided to realize battery capacity expansion of the electronic apparatus 1, and is not necessary for use of the electronic apparatus 1. That is, the electronic apparatus 1 can be used even in a state in which the external device 2 is in a non-connection single body state.

The external device 2 in this example functions as an extension grip that extends a grip portion different from the grip portion 1$b$ to the electronic apparatus 1. The external device 2 is provided with a convex portion 2$a$ that is inserted into the battery mounting unit 1$a$ when being connected to the electronic apparatus 1, and a fixing portion 2$b$ that fixes the external device 2 to the electronic apparatus 1.

The convex portion 2$a$ has a shape similar to that of the secondary battery 3A that is mounted in the battery mounting unit 1$a$, and when the convex portion 2$a$ is inserted into the battery mounting unit 1$a$, positioning of an attachment position of the external device 2 with respect to the electronic apparatus 1 is established.

In this example, the fixing portion 2$b$ includes a screw portion, and when the screw portion is screwed to a screw hole portion formed on the electronic apparatus 1 side, the external device 2 of which positioning is established by the convex portion 2$a$ and the battery mounting unit 1$a$ and which is attached to the electronic apparatus 1 is fixed to the electronic apparatus 1 side.

in addition, the external device 2 is also provided with an operator 2c that performs various operation inputs with respect to the electronic apparatus 1. In the drawing, a dial-type operator (for example, an operator for setting various parameters such as a shutter speed and an aperture value) is exemplified as the operator 2c, but other operation units such as a shutter button (not illustrated) are also provided as the operator 2c.

Here, in this example, it is assumed that the secondary batteries 3A to 3C are set to products of the same model number. That is, the secondary batteries 3A to 3C are set to the same shape and size, and battery capacities thereof approximately match each other.

Hereinafter, the secondary battery 3A may be noted as "internal battery 3A". In addition, the secondary battery 3B may be noted as "first external battery 3B", and the secondary battery 3C may be noted as "second external battery 3C". In a case where the secondary batteries 3A to 3C are collectively referred, the secondary batteries 3A to 3C are noted as "secondary battery 3".

In this example, lithium ion batteries are used as the secondary batteries 3A to 3C.

Note that, a mounting method of the secondary battery 3 in both the electronic apparatus 1 and the external device 2 is arbitrarily selected. For example, a mounting method of accommodating the entirety of the secondary battery 3 in a housing may be employed, or a mounting method in which the secondary battery 3 is mounted in a state in which a part or the entirety thereof is exposed with respect to a predetermined mounting unit may be employed.

An electrical configuration of the charging system will be described with reference to FIG. 2 and FIG. 3.

Figure 2:
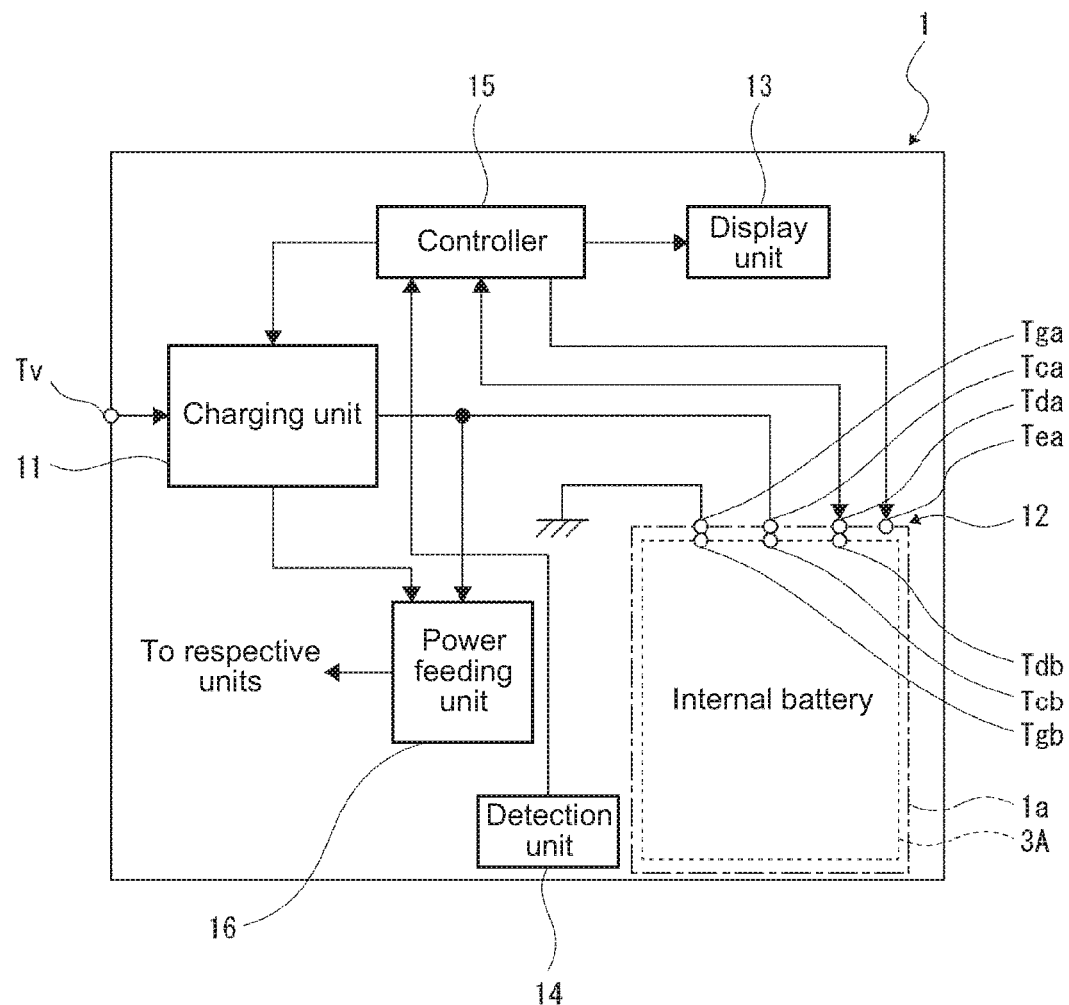
FIG. 2 is a view for describing an electrical configuration of the charging system of the first embodiment, and is a block diagram illustrating an internal configuration of the electronic apparatus in a state in which secondary battery is mounted in a battery mounting unit.

FIG. 2 is a block diagram illustrating an internal configuration of the electronic apparatus 1 in a state in which the external device 2 is set to non-connection and the secondary battery 3 as the internal battery 3A is mounted in the battery mounting unit 1a. FIG. 3 is a block diagram illustrating an internal configuration of each of the electronic apparatus 1 and the external device 2 in a state in which connection of the external device 2 is established.

First, description will be given of a terminal configuration in the secondary battery 3 as the internal battery 3A, the first external battery 3B, and the second external battery 3C.

The secondary battery 3 includes a data terminal Tdb for transmitting and receiving various pieces of data to and from the electronic apparatus 1 (a controller 15 to be described later), a charging/power feeding terminal Tcb that is set as a charging/power feeding common terminal that receives power supply for charging from the electronic apparatus 1 side, and performs power supply with respect to the electronic apparatus 1 side, and a ground terminal Tgb that is connected to a ground (refer to FIG. 2 and FIG. 3).

Although not illustrated in the drawing, the secondary battery 3 in this example is set as an integrated circuit (IC) built-in type battery pack, and the IC and battery cells are accommodated in a housing. The IC of the secondary battery 3 has at least a function of measuring a charging rate (state of charge (SOC)) of the secondary battery 3, a function of performing an authentication process with the electronic apparatus 1, and a function of transmitting operation input information of the operator 2c.

The data terminal Tda is set as a terminal that transmits and receives data for the authentication process, data indicating the charging rate, data as operation input information of the operator 2c, and the like between the IC in the secondary battery 3 and the electronic apparatus 1.

Next, a configuration of the electronic apparatus 1 will be described.

The electronic apparatus 1 includes a power input terminal Tv that inputs external input power, a charging unit 11 that charges the secondary battery 3 on the basis of the external input power, a connection unit 12 that establishes electrical connection of the external device 2, a display unit 13 that performs display with respect to information indicating a charging operation state of the charging unit 11, a detection unit 14 that detects attachment/detachment of the external device 2, a controller 15 that controls a charging operation by the charging unit 11 or a display operation by the display unit 13, and a power feeding unit 16 that performs power feeding (supply of an operation voltage) to respective parts of the electronic apparatus 1 on the basis of power supply from the secondary battery 3.

For example, the power input terminal Tv is set as a universal serial bus (USB) terminal, or a terminal that inputs an output voltage from an AC adapter that transforms an input voltage from a commercial AC power.

Power (external input power) input from the outside through the power input terminal Tv is supplied to the charging unit 11.

When being instructed to charge the secondary battery 3 from the controller 15, the charging unit 11 stops a power feeding operation by the power feeding unit 16, and outputs power for charging the secondary battery 3 to the connection unit 12 on the basis of the external input power. In this example, when a voltage higher than a power feeding voltage is applied to the connection unit 12 (charging/power feeding terminal Tca to be described later) in a state in which power feeding is stopped as described above, it is possible to perform charging with respect to the secondary battery 3.

The connection unit 12 includes a data terminal Tda that is electrically connected to the data terminal Tdb in the secondary battery 3, the charging/power feeding terminal Tca that is electrically connected to the charging/power feeding terminal Tcb, and a ground terminal Tga that is electrically connected to the ground terminal Tgb.

As illustrated in the drawing, the data terminal Tda is connected to the controller 15, the charging/power feeding terminal Tca is connected to the charging unit 11 and the power feeding unit 16, and the ground terminal Tga is connected to a ground of the electronic apparatus 1.

In addition, the connection unit 12 includes a switching signal terminal Tea in combination with the respective terminals T. The switching signal terminal Tea is connected to the controller 15.

The display unit 13 includes, for example, a lighting tool such as a light-emitting diode (LED) that displays information indicating a charging operation state of the charging unit 11.

The detection unit 14 includes a switch that is turned on/off in correspondence with attachment/detachment of the external device 2 with respect to the electronic apparatus 1. The detection unit 14 outputs a signal of which a level (for example, a voltage value) varies in correspondence with on/off of the switch to the controller 15 as an attachment and detachment detection signal.

For example, the controller 15 includes a microcomputer including a central processing unit (CPU), a read only memory (ROM), a random access memory (RAM), and performs various processes, for example, on the basis of a program stored in a predetermined storage device such as the ROM.

Note that, the processes as embodiments executed by the controller 15 will be described later.

As illustrated in FIG. 2, in a state in which the secondary battery 3 as the internal battery 3A is mounted in the battery mounting unit 1a, the data terminal Tdb and the data terminal Tda, the charging/power feeding terminal Tcb and the charging/power feeding terminal Tca, and the ground terminal Tgb and the ground terminal Tga respectively come into contact with each other between the internal battery 3A and the connection unit 12.

According to this, it enters a state in which data transmission and reception between the controller 15 and the IC of the internal battery 3A, charging with respect to the internal battery 3A by the charging unit 11, and power feeding from the internal battery 3A to the power feeding unit 16 are possible.

Next, a configuration of the external device 2 will be described.

Figure 3:
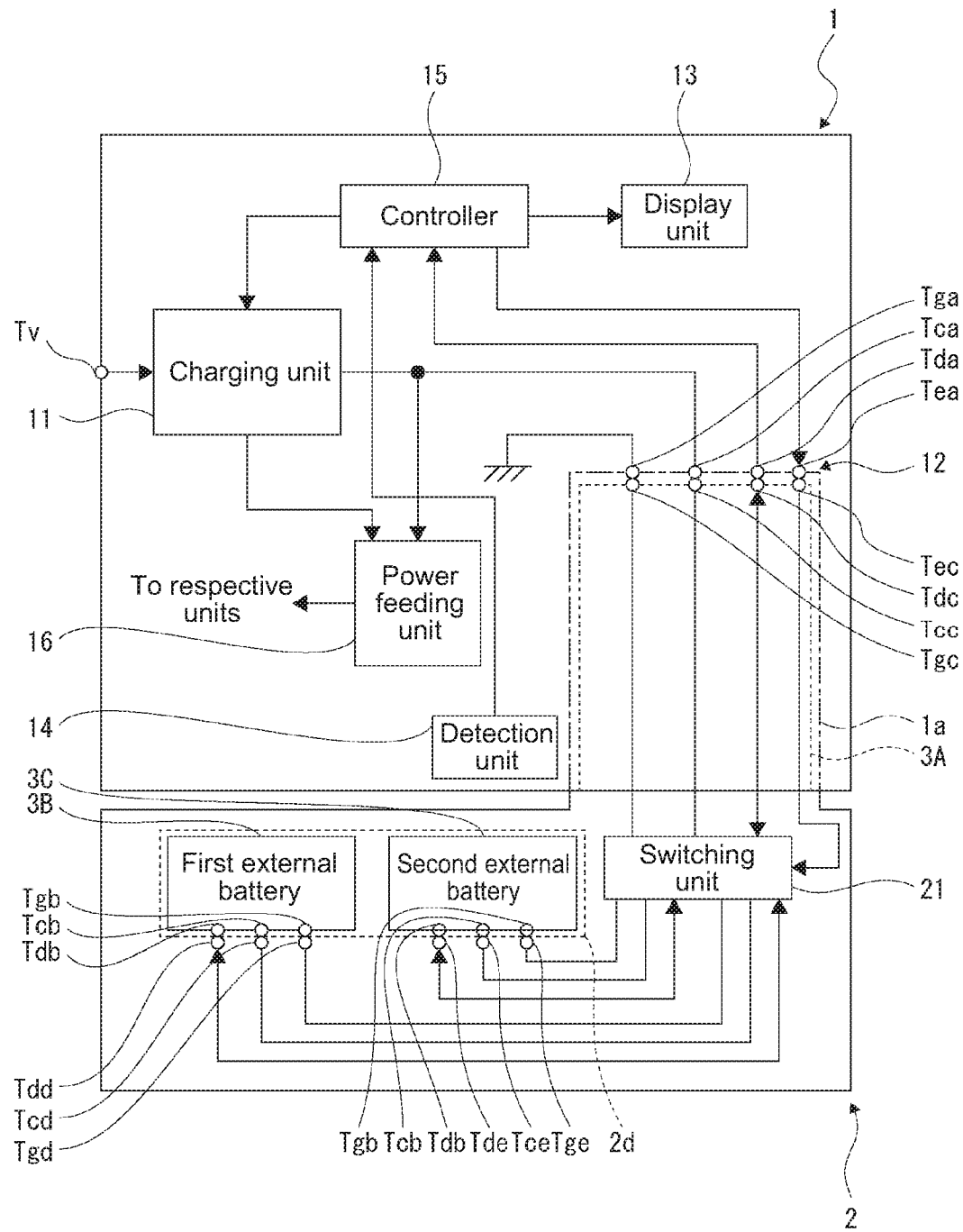
FIG. 3 is a view for describing the electrical configuration of the charging system of the first embodiment, and is a block diagram illustrating an internal configuration of each of the electronic apparatus in a state in which connection of the external device is established, and the external device.

As illustrated in FIG. 3, the external device 2 includes a data terminal Tdc, a charging/power feeding terminal Tcc, a ground terminal Tgc, and a switching signal terminal Tec which are provided in correspondence with the data terminal Tda, the charging/power feeding terminal Tca, the ground terminal Tga, and the switching signal terminal Tea of the electronic apparatus 1; a data terminal Tdd, a charging/power feeding terminal Tcd, and a ground terminal Tgd which are provided in correspondence with the data terminal Tdb, the charging/power feeding terminal Tcb, and the ground terminal Tgb of the first external device 3B; and a data terminal Tde, a charging/power feeding terminal Tce, and a ground terminal Tge which are provided in correspondence with the data terminal Tdb, the charging/power feeding terminal Tcb, and the ground terminal Tgb.

In addition, the external device 2 includes a switching unit 21 that switches the secondary battery 3 to be electrically connected to the electronic apparatus 1 side to any one of the first external battery 3B and the second external battery 3C.

In addition, the external device 2 includes a battery mounting unit 2d that is provided in such a manner that the first external battery 3B and the second external battery 3C are to be attachable and detachable by a user. Note that, the battery mounting unit 2d in this example is configured to accommodate both the first external battery 3B and the second external battery 3C, but the battery mounting unit 2d may be provided independently for each of the first external battery 3B and the second external battery 3C.

The data terminal Tdc, the charging/power feeding terminal Tcc, the ground terminal Tgc, and the switching signal terminal Tec are provided at a tip end portion of the convex portion 2a (an end in a protruding direction of the convex portion 2a), and respectively come into contact with the data terminal Tda, the charging/power feeding terminal Tca, the ground terminal Tga, and the switching signal terminal Tea in the connection unit 12 in a state in which the external device 2 is attached (mounted) to the electronic apparatus 1, that is, the convex portion 2a is inserted into the battery mounting unit 1a as illustrated in the drawing.

The data terminal Tdc, the charging/power feeding terminal Tcc, the ground terminal Tgc, and the switching signal terminal Tec are respectively connected to the switching unit 21.

In addition, the data terminal Tdd, the charging/power feeding terminal Tcd, and the ground terminal Tgd, and the data terminal Tde, the charging/power feeding terminal Tce, and the ground terminal Tge are also connected to the switching unit 21.

When the first external battery 3B is mounted in the external device 2, the data terminal Tdd, the charging/power feeding terminal Tcd, and the ground terminal Tgd respectively come into contact with the data terminal Tdb, the charging/power feeding terminal Tcb, and the ground terminal Tgb in the first external battery 3B. Similarly, when the second external battery 3C is mounted in the external device 2, the data terminal Tde, the charging/power feeding terminal Tce, and the ground terminal Tge respectively come into contact with the data terminal Tdb, the charging/power feeding terminal Tcb, and the ground terminal Tgb in the second external battery 3C.

The switching unit 21 is configured as a selector that switches a state in which the data terminal Tdd, the charging/power feeding terminal Tcd, and the ground terminal Tgd which are provided in correspondence with the first external battery 3B are electrically connected to the data terminal Tdc, the charging/power feeding terminal Tcc, and the ground terminal Tgc which are provided in the convex portion 2a, and a state in which the data terminal Tde, the charging/power feeding terminal Tce, and the ground terminal Tge which are provided in correspondence with the second external battery 3C are electrically connected to the data terminal Tdc, the charging/power feeding terminal Tcc, and the ground terminal Tgc.

Specifically, with respect to the data terminal Td, the charging/power feeding terminal Tc, and the ground terminal Tg, the switching unit 21 switches a first selection state Ss1 in which "Tdc and Tdd", "Tcc and Tcd", and "Tgc and Tgd" are electrically connected to each other, and a second selection state Ss2 in which "Tdc and Tde", "Tcc and Tce", and "Tgc and Tge" are electrically connected.

According to this, in a state in which the external device 2 in which the first external battery 3B and the second external battery 3C are mounted is mounted to the electronic apparatus 1, it is possible to switch an electrical connection destination with the electronic apparatus 1 to any one of the first external battery 3B and the second external battery 3C.

The switching unit 21 performs switching between the first selection state Ss1 and the second selection state Ss2 on the basis of a switching signal that is input from the controller 15 through the switching signal terminal Tea and Tec.

[1-2. Process Procedure]

Next, description will be given of a charging relating control process as a first embodiment executed by the controller 15 with reference to a flowchart in FIG. 4.

Figure 4:
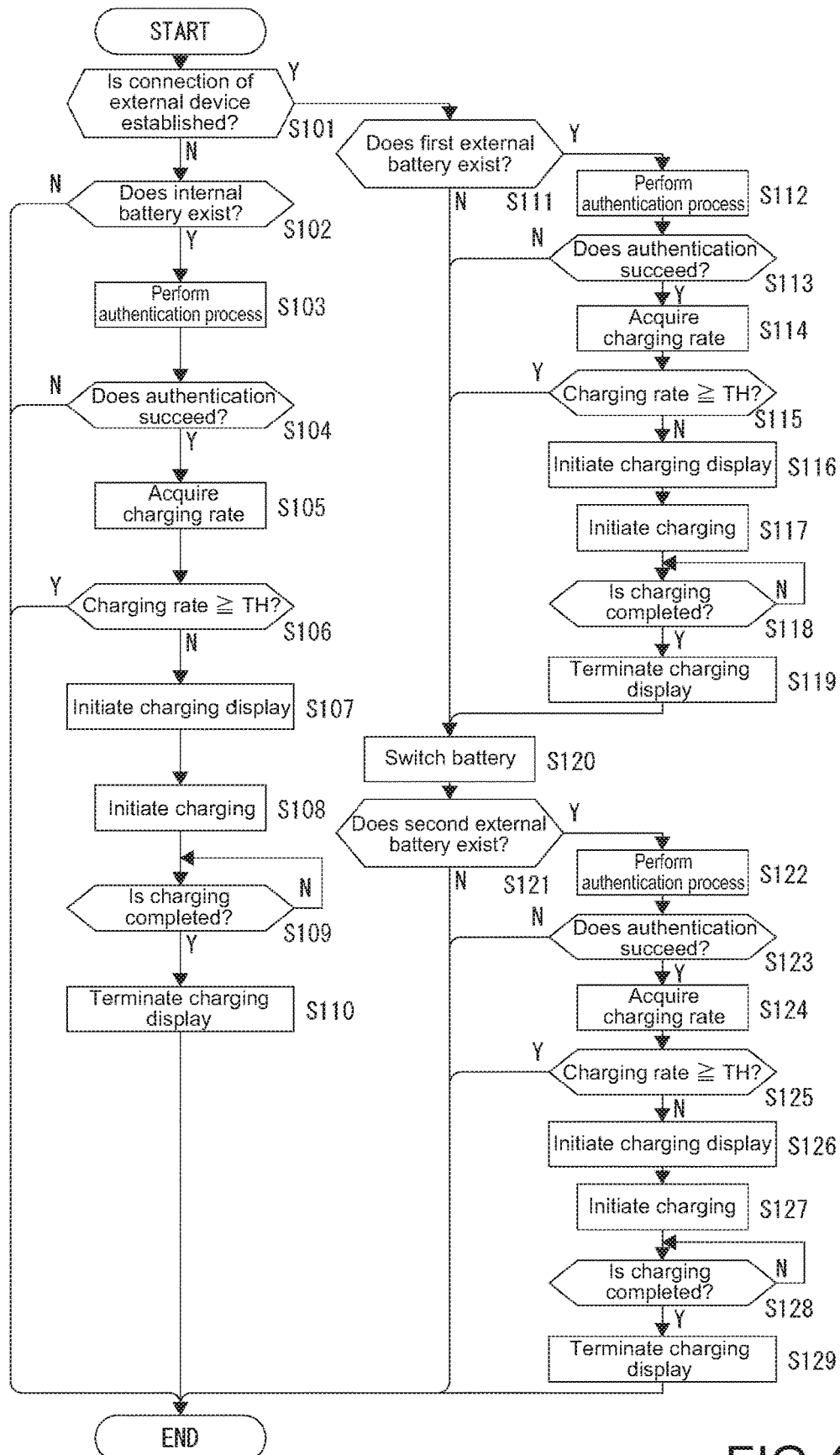
FIG. 4 is a flowchart illustrating a charging relating control process as the first embodiment.

Note that, it is assumed that input of external input power through the power input terminal Tv is in a possible state when initiating the process in FIG. 4. In the case of this example, even in a state in which the internal battery 3A and the external device 2 are in an electrical non-connection state with respect to the electronic apparatus 1, it is assumed that the controller 15 can operate on the basis of external input power through the power input terminal Tv.

First, in step S101, the controller 15 determines whether or not connection of the external device 2 is established. The determination is performed on the basis of an attachment and detachment detection signal from the detection unit 14. That is, in a case where the attachment and detachment detection signal indicates a mounting state of the external device 2, a positive result is obtained, and in the opposite case, a negative result is obtained.

In the case of obtaining a negative result indicating that the external device 2 is not connected, the controller 15 causes the process to proceed to step S102, and determines whether or not the internal battery 3A exists, that is, whether or not electrical connection with the internal battery 3A is established. For example, the determination process in step S102 is executed as a process of determining whether or not communication with the IC of the internal battery 3A is possible through the data terminal Tda (for example, whether or not a response with respect to a response request made for the IC exists).

When the internal battery 3A does not exist, the controller 15 terminates the process illustrated in FIG. 4. That is, in this case, since the secondary battery 3 to be a charging target does not exist, the controller 15 terminates the charging relating control process.

When the internal battery 3A exists, the controller 15 causes the process to proceed to step S103, and performs an authentication process of the internal battery 3A. That is, an authentication process with respect to the IC in the internal battery 3A is performed. The authentication process is a process of confirming whether or not the secondary battery 3 is a specific product, and is formed, for example, as a process of confirming whether or not information of the IC is specific information, or the like. Note that, as the authentication process, various methods are considered, and there is no limitation to specific methods.

In subsequent step S104, the controller 15 determines whether or not authentication succeeds. In a case where authentication does not succeed, the controller 15 terminates the process illustrated in FIG. 4. That is, charging is not performed with respect to the secondary battery 3 which fails in authentication.

In a case where authentication succeeds, the controller 15 causes the process to proceed to step S105, and performs a charging rate acquisition process. That is, the controller 15 acquires information indicating the charging rate of the internal battery 3A which is measured by the IC through communication with the IC of the internal battery 3A.

In subsequent step S106, the controller 15 determines whether or not the charging rate is equal to or greater than a charging-unnecessary threshold value TH. Here, the charging-unnecessary threshold value TH may be set to a value near a charging rate (100%) corresponding to full charging. In this example, the charging-unnecessary threshold value TH is set to 100%.

When the charging rate is equal to or greater than the charging-unnecessary threshold value TH, the controller 15 terminates the process illustrated in FIG. 4.

On the other hand, when the charging rate is not equal to or greater than the charging-unnecessary threshold value TH, the controller 15 causes the process to proceed to step S107, and performs a charging display initiation process. The charging display initiation process is a process of causing the display unit 13 to initiate display of information indicating that at least the secondary battery 3 is being charged. Specifically, in this example, a process of initiating lighting of a lighting tool of the display unit 13 is performed.

In correspondence with execution of the charging display initiation process in step S107, the controller 15 performs a process of initiating a charging operation by the charging unit 11 as a charging initiation process in step S108. According to this, charging to the internal battery 3A is initiated.

In subsequent step S109, the controller 15 waits for completion of charging. That is, the controller 15 waits for completion of charging of the secondary battery 3 (in this case, the internal battery 3A) of which electrical connection is established through the connection unit 12.

In a case where charging is completed, the controller 15 causes the process to proceed to step S110 and performs a charging display termination process. That is, the controller 15 performs a process of terminating the display that is initiated by the display unit 13 in step S107, specifically, a process of turning off the lighting tool.

In correspondence with execution of the process in step S110, the controller 15 terminates the process illustrated in FIG. 4.

In addition, in the case of obtaining a positive result indicating that connection of the external device 2 is established in previous step S101, the controller 15 causes the process to proceed to step S111.

In step S111, the controller 15 determines whether or not the first external battery 3B exists. Note that, in execution of the determination process in step S111, the controller 15 controls the switching unit 21 to enter the above-described first selection state Ss1 in advance.

As in previous step S102, the determination process of existence or non-existence of the first external battery 3B is executed, for example, as a process of determining whether or not communication with the IC of the first external battery 3B is possible through the data terminal Tda. This configuration is also true of a determination process of existence or non-existence of the second external battery 3C to be described later.

Note that, with regard to determination of existence and non-existence of the first external battery 3B and the second external battery 3C, a switch that is turned on/off in correspondence with mounting or non-mounting of the secondary batteries 3, or the like may be provided as a detection unit, and the determination may be performed on the basis of a detection signal by the detection unit.

When the first external battery 3B exists, the controller 15 causes the process to proceed to an authentication process in step S112.

Here, the processes in steps S112 to S119 are similar to the processes in steps S103 to S110, and thus redundant description thereof will be omitted. At this time, in the case of obtaining a determination result indicating that authentication fails in the determination process in step S113, in the case of obtaining a determination result indicating that the charging rate is equal to or greater than the charging-unnecessary threshold value TH in the determination process in step S115, and in the case of executing the charging display termination process in step S119, the controller 15 causes the processes to proceed to step S120.

In step S120, the controller 15 controls the switching unit 21 to enter the above-described second selection state Ss2 as a battery switching process. That is, in a case where the charging relating process in which the first external battery 3B is set as a target is completed, an electrical connection destination with the electronic apparatus 1 can be switched to the second external battery 3C.

In step S121 subsequent to step S120, the controller 15 determines whether or not the second external battery 3C exists. When the second external battery 3C does not exist, the controller 15 terminates the process illustrated in FIG. 4, and when the second external battery 3C does not exist, the controller 15 causes the process to proceed to an authentication process in step S122. Processes in steps S122 to S129 are similar to the processes in steps S103 to S110, and redundant description thereof will be omitted.

Through the above-described processes, in the first embodiment, in a case where the external device 2 is not mounted in the electronic apparatus 1 and the internal battery 3A is mounted in the battery mounting unit 1a, charging with respect to the internal battery 3A is performed on the basis of the authentication process result of the internal battery 3A or the charging rate comparison result with the charging-unnecessary threshold value TH.

On the other hand, in a state in which the external device 2 is electrically connected to the electronic apparatus 1 through the battery mounting unit 1a from which the internal battery 3A is detached, charging with respect to the first external battery 3B and the second external battery 3C is performed on the basis of existence or non-existence of the first external battery 3B and the second external battery 3C, the authentication processing result of the batteries, or the charging rate comparison result with the charging-unnecessary threshold value TH.

At this time, the electronic apparatus 1 charges the first external battery 3B and the second external battery 3C provided in the external device 2 by the charging unit 11 through the connection unit 12.

According to this, when charging the secondary battery 3 in the external device 2, it is not necessary to provide the charging unit 11 in the external device 2.

Accordingly, a reduction in the number of parts of the external device 2 is realized, and thus it is possible to realize a reduction in the cost of the external device 2.

In addition, in the electronic apparatus 1 of the first embodiment, the connection unit 12 establishes electrical connection of the external device 2 by a terminal that is common to the secondary battery 3 mounted in the battery mounting unit 1a.

According to this, it is not necessary to provide a configuration (the switching unit 21) for switching the secondary battery 3 that is a charging destination in the electronic apparatus 2. Accordingly, a reduction in the number of parts of the electronic apparatus 1 is realized, and thus it is possible to realize a reduction in the cost thereof.

2. Second Embodiment

[2-1. Configuration of Charging System]

Figure 5:
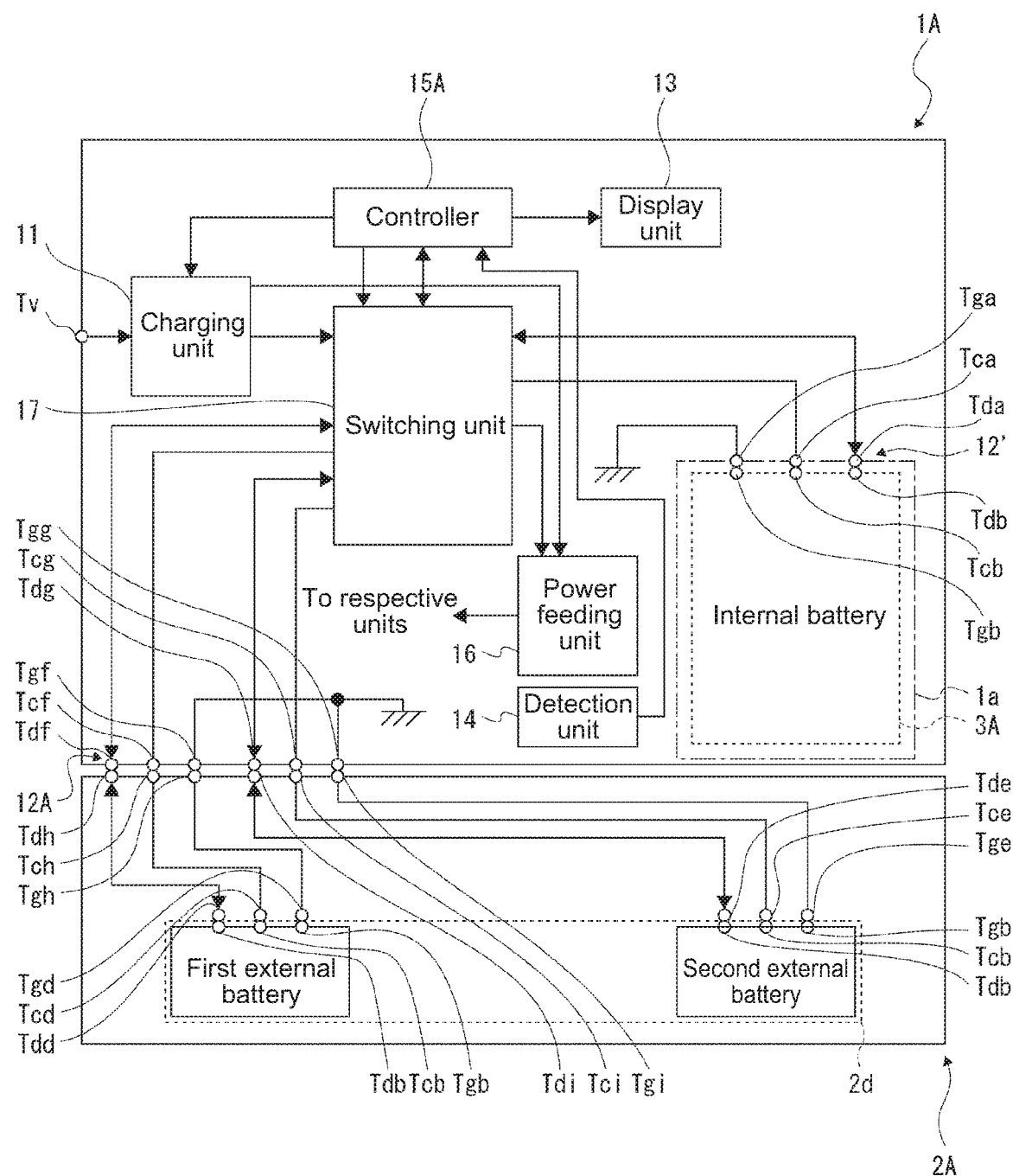
FIG. 5 is a block diagram for describing an electrical configuration of a charging system of a second embodiment.

Next, a charging system of a second embodiment will be described with reference to a block diagram in FIG. 5.

Note that, in the following description, the same reference numeral will be given to a portion similar to a portion described above, and description thereof will be omitted.

The charging system of the second embodiment has a configuration in which an external device can be mounted to an electronic apparatus in a state in which an internal battery is mounted in a battery mounting unit of the electronic apparatus.

Specifically, the charging system of the second embodiment includes an electronic apparatus 1A and an external device 2A.

The electronic apparatus 1A is different from the electronic apparatus 1 of the first embodiment in that an internal battery connection unit 12' is provided instead of the connection unit 12, a controller 15A is provided instead of the controller 15, a connection unit 12A including a data terminal Tdf, a charging/power feeding terminal Tcf, a ground terminal Tgf, a data terminal Tdg, a charging/power feeding terminal Tcg, and a ground terminal Tgg, and a switching unit 17 are provided.

In addition, the external device 2A is different form the external device 2 in that the convex portion 2a and the switching unit 21 are not provided, and a data terminal Tdh, a charging/power feeding terminal Tch, a ground terminal Tgh, a data terminal Tdi, a charging/power feeding terminal Tci, and a ground terminal Tgi are provided.

In the external device 2A, the data terminal Tdh, the charging/power feeding terminal Tch, and the ground terminal Tgh are provided as terminals corresponding to a first external battery 3B, and are respectively connected to a data terminal Tdd, a charging/power feeding terminal Tcd, a power feeding terminal Tsd, and a ground terminal Tgd as illustrated in the drawing.

In addition, the data terminal Tdi, the charging/power feeding terminal Tci, and the ground terminal Tgi are provided as terminals corresponding to a second external battery 3C, and are respectively connected to a data terminal Tde, a charging/power feeding terminal Tce, and a ground terminal Tge.

In the electronic apparatus 1A, the internal battery connection unit 12' is different from the connection unit 12 in that the switching signal terminal Tea is not provided.

As illustrated in the drawing, the data terminal Tda and the charging/power feeding terminal Tca in the internal battery connection unit 12' are connected to the switching unit 17.

In addition, in the electronic apparatus 1A, the data terminal Tdf, the charging/power feeding terminal Tcf, and the ground terminal Tgf in the connection unit 12A are set as terminals corresponding to the first external battery 3B. In addition, the data terminal Tdg, the charging/power feeding terminal Tcg, and the ground terminal Tgg in the connection unit 12A are set as terminals corresponding to the second external battery 3C.

The data terminal Tdf, the charging/power feeding terminal Tcf, the data terminal Tdg, and the charging/power feeding terminal Tcg are connected to the switching unit 17.

Note that, the ground terminal Tgf and the ground terminal Tgg are connected to a ground in the electronic apparatus 1A.

The data terminal Tdf, the charging/power feeding terminal Tcf, and the ground terminal Tgf respectively come into contact with the data terminal Tdh, the charging/power feeding terminal Tch, and the ground terminal Tgh of the external device 2A in a state in which the external device 2A is attached to the electronic apparatus 1A.

The data terminal Tdg, the charging/power feeding terminal Tcg, and the ground terminal Tgg respectively come into contact with the data terminal Tdi, the charging/power feeding terminal Tci, and the ground terminal Tgi of the external device 2A in a state in which the external device 2A is attached to the electronic apparatus 1A.

The switching unit 17 is connected to the charging unit 11, the controller 15A, and the power feeding unit 16.

The switching unit 17 is configured as a selector that switches a first selection state Ss1', a second selection state Ss2', and a third selection state Ss3 to be described below.

That is, the first selection state Ss1' is a state in which the data terminal Tdf is connected to the controller 15A, and the charging/power feeding terminal Tcf is connected to the charging unit 11 and the power feeding unit 16.

In addition, the second selection state Ss2' is a state in which the data terminal Tdg is connected to the controller 15A, and the charging/power feeding terminal Tcg is connected to the charging unit 11 and the power feeding unit 16.

The third selection state Ss3 is a state in which the data terminal Tda of the internal battery connection unit 12' is connected to the controller 15A, and the charging/power feeding terminal Tca is connected to the charging unit 11 and the power feeding unit 16.

According to this, in a state in which the external device 2A in which the first external battery 3B and the second external battery 3C are mounted is mounted to the electronic apparatus 1A, and the internal battery 3A is mounted in the battery mounting unit 1a, it is possible to switch the secondary battery 3 in which charging by the charging unit 11, transmission and reception of data to and from the controller 15A, and power feeding with respect to the power feeding unit 16 are possible to any one of the first external battery 3B, the second external battery 3C, and the internal battery 3A.

The switching unit 17 performs switching between the first selection state Ss1', the second selection state Ss2', and the third selection state Ss3 on the basis of a switching signal input from the controller 15A.

The controller 15A is different from the controller 15 according to the first embodiment in that a charging relating control process as the second embodiment to be described below is executed as a process relating to charging of the secondary battery 3.

[2-2. Process Procedure]

Next, description will be given of the charging relating control process as the second embodiment executed by the controller 15A with reference to a flowchart in FIG. 6.

Figure 6:
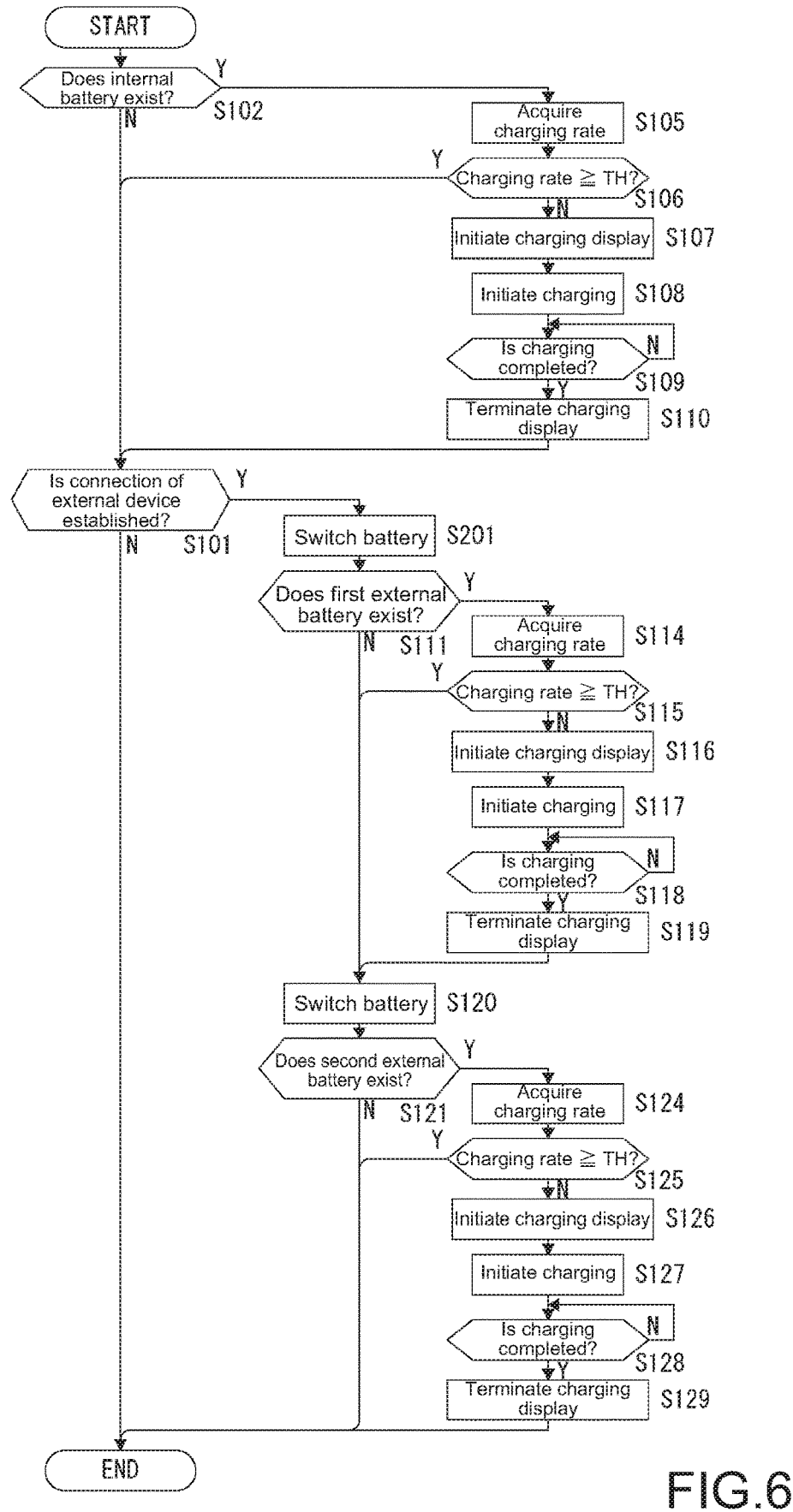
FIG. 6 is a flowchart illustrating a charging relating control process as the second embodiment.

Note that, it is assumed that input of external power through the power input terminal Tv is in a possible state when initiating the process in FIG. 6. In addition, even in a state in which the internal battery 3A and the external device 2A are in an electrical non-connection state with respect to the electronic apparatus 1A, it is assumed that the controller 15A can operate on the basis of external input power through the power input terminal Tv.

First, in step S102, the controller 15A determines whether or not the internal battery 3A exists. The controller 15A in the second embodiment controls the switching unit 17 to enter the third selection state Ss3 when executing a determination process in step S102.

Note that, with regard to the determination process in step S102 in this case, a switch that is turned on/off in correspondence with existence or non-existence of the internal battery 3A, or the like may be provided as a detection unit, and the determination process may be performed on the basis of a detection signal by the detection unit.

In step S102, in a case where it is determined that the internal battery 3A exists, the controller 15A causes the process to proceed to step S105. According to this, acquisition of a charging rate of the internal battery 3A set as a target (S105) is performed, and when the charging rate is less than the charging-unnecessary threshold value TH, processes in steps S107 to S110 are executed.

On the other hand, in a case where it is determined in step S102 that the internal battery 3A does not exist, in a case where it is determined in step S106 that the charging rate is equal to or greater than the charging-unnecessary threshold value TH, and in a case where a display termination process in step S110 is executed, the controller 15A causes the process to proceed to step S101, and determines whether or not connection of the external device 2A is established.

When connection of the external device 2A is not established, the controller 15A terminates the process illustrated in FIG. 6.

In addition, when connection of the external device 2A is established, the controller 15A causes the process to proceed to step S201, and performs a battery switching process, that is, a process of controlling the switching unit 17 to enter the above-described first selection state Ss1', and determines whether or not the first external battery 3B exists in subsequent step S111. Note that, processes subsequent to step S111 are similar to the processes in the case in FIG. 4 except for the following two configurations, and thus redundant description will be omitted.

Specifically, the different configurations are as follows. In a case where a positive result is obtained in step S111, the process is caused to proceed to step S114, and in a case where a positive result is obtained in step S121, the process is caused to proceed to step S124.

Note that, description relating to the authentication process of the secondary battery 3 (S103 and the like) and the charging control process (S104 and the like) corresponding to an authentication result is omitted for convenience of illustration, it is needless to say that the processes can be performed in a similar manner as in the first embodiment.

Note that, this is also true of a third embodiment to be described later.

In the electronic apparatus 1A of the second embodiment, in a case where the secondary battery 3 is mounted on an inner side and on an outer side of the electronic apparatus 1A, and charging to the secondary battery 3 is possible, charging is performed preferentially from the secondary battery 3 on the inner side.

In a case where charging of the secondary battery 3 on the inner side is preferentially initiated as described above, when it is necessary for a user to terminate charging in the middle of the charging and to use the electronic apparatus 1A, even in a case where the electronic apparatus 1 is necessary to be used in a state in which the external device is detached therefrom, since the secondary battery 3 on the inner side is in a charged state, and thus it is possible to use the electronic apparatus 1A as is. That is, it is possible to use the electronic apparatus 1A without a time for taking out the secondary battery 3 mounted in the external device 2A to substitute for the secondary battery 3 mounted in the battery mounting unit 1a.

In addition, in the second embodiment, the connection unit 12A includes terminals (charging/power feeding terminals Tcf and Tcg) for charging of the secondary battery 3 mounted in the external device 2A, and the terminals for charging are set as terminals different from the terminal (charging/power feeding terminal Tca) for charging of the secondary battery 3A mounted in the battery mounting unit 1a.

According to this, it is not necessary to provide a configuration for switching the secondary battery 3 that is a charging destination in the external device 2A. Accordingly, a reduction in the number of parts of the external device 2A is realized, and thus it is possible to realize a reduction in the cost thereof.

In addition, when connecting the external device 2A to the electronic apparatus 1A, it is not necessary to remove the secondary battery 3 from the battery mounting unit 1a as in the first embodiment.

Accordingly, even in a case where the external device 2A is connected to the electronic apparatus 1A, the secondary battery 3 mounted in the battery mounting unit 1a can be used to drive the electronic apparatus 1A, and it is possible to realize extension of a drive time of the electronic apparatus 1A.

3. Third Embodiment

A third embodiment is configured to perform charging control in consideration of charging efficiency of the secondary battery 3.

Note that, a configuration of a charging system of the third embodiment is similar to the first embodiment. In the third embodiment, a modification is made from the first embodiment with respect to the process that is executed by the controller 15 of the electronic apparatus 1, and the configuration of the electronic apparatus 1 and the external device 2 is similar to that described in FIG. 2 and FIG. 3. Accordingly, redundant description will be omitted.

Note that, the controller 15 in the electronic apparatus 1 of the third embodiment is noted as a controller 15B.

Figure 7:
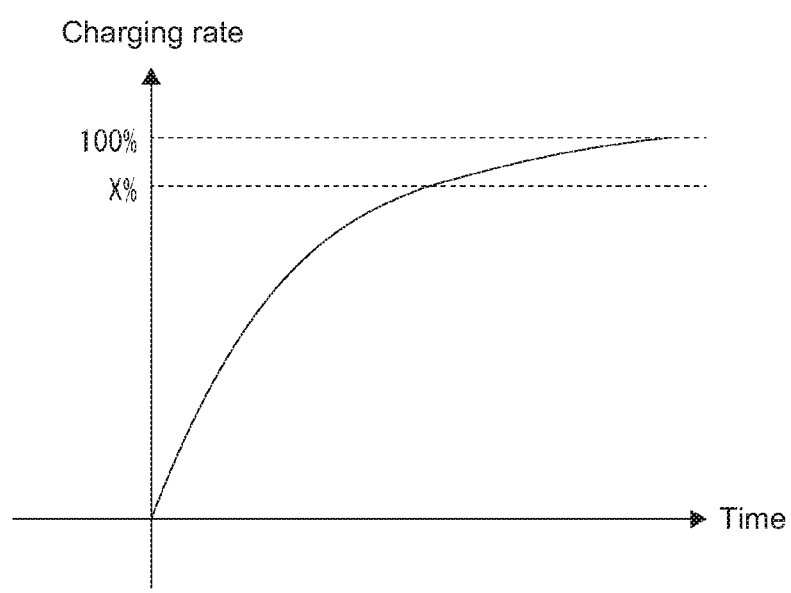
FIG. 7 is a view illustrating an example of charging efficiency characteristics of a secondary battery that is used in the embodiments.

As schematically illustrated in FIG. 7, the secondary battery 3 such as a lithium ion battery used in the embodiments has a tendency that the higher a charging rate is, the further charging efficiency decreases. Note that, the charging efficiency represents a charging amount per unit time (an increase in the charging rate).

In addition, in the secondary battery 3, a decrease in charging efficiency becomes significant in a charging rate region up to full charging (charging rate of 100%) exceeding a predetermined charging rate (noted as X % in the drawing).

Hereinafter, the predetermined charging rate as X % at which a decrease in charging efficiency becomes significant is noted as "charging rate X", and execution of charging up to the charging rate X is noted as "practical charging".

In the third embodiment, the following control is performed in consideration of the above-described charging efficiency characteristics of the secondary battery 3.

That is, in a case where a plurality of the secondary batteries 3 exists as a charging target, charging is initiated preferentially from a secondary battery 3 of which the charging rate is low.

In addition, in a case where a plurality of secondary batteries 3 of which the charging rate is less than the charging rate X exists as a charging target secondary battery 3, in correspondence with charging (practical charging) of any one secondary battery 3 up to the charging rate X, charging of the secondary battery 3 is suspended, and another secondary battery 3 is charged (practically charged) up to the charging rate X.

A charging relating control process as a third embodiment which is executed by the controller 15B will be described with reference to flowcharts in FIG. 8 and FIG. 9.

Figure 8:
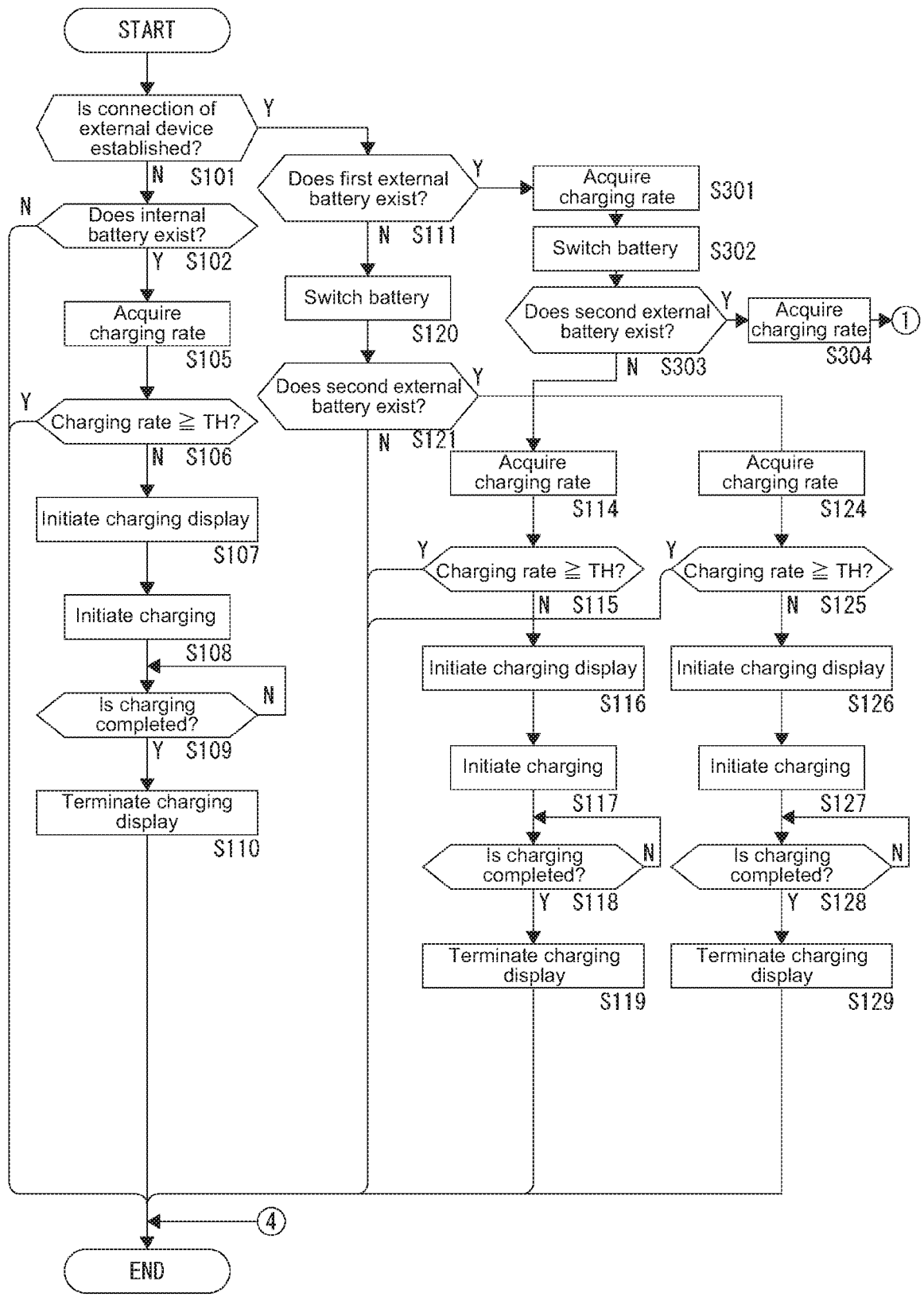
FIG. 8 is a flowchart illustrating a charging relating control process as a third embodiment.
Figure 9:
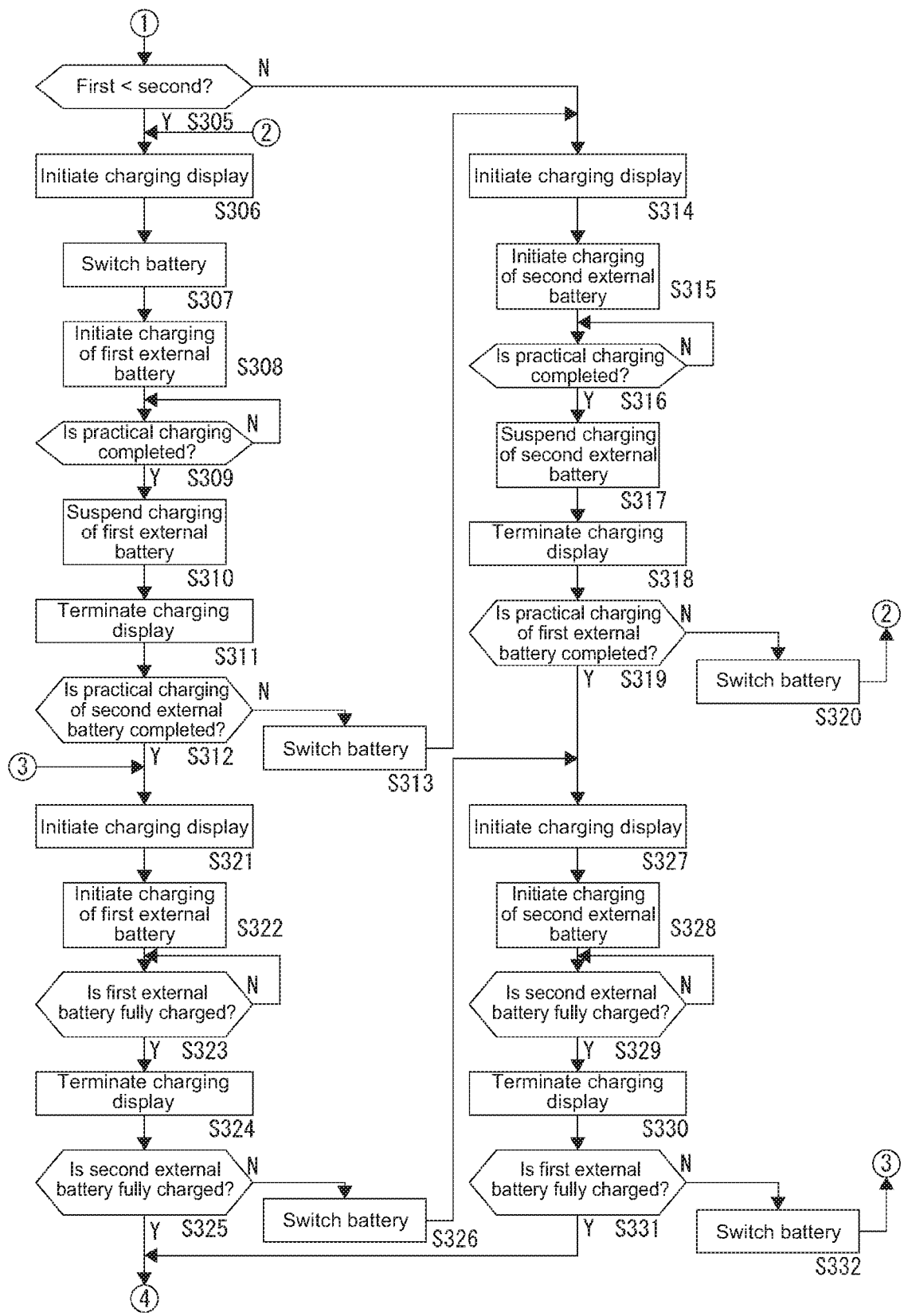
FIG. 9 is a flowchart illustrating the charging relating control process as the third embodiment in combination with FIG. 8.

Note that, it is assumed that input of external power through the power input terminal Tv is in a possible state when initiating a series of processes illustrated in FIG. 8 and FIG. 9. In addition, even in a state in which the internal battery 3A and the external device 2 are in an electrical non-connection state with respect to the electronic apparatus 1, it is assumed that the controller 15B can operate on the basis of external input power through the power input terminal Tv.

First, in step S101, the controller 15B determines whether or not connection of the external device 2 is established.

Note that, processes in which the internal battery 3A is set as a target in a case where connection of the external device 2 is not established are similar to the processes in the case in FIG. 4 (provided that, in this case, the processes in steps S103 and S104 relating to battery authentication are omitted in this example).

When connection of the external device 2 is established, the controller 15B causes the process to proceed to step S111, and determines whether or not the first external battery exists.

When the first external battery 3B does not exist, the controller 15B executes a battery switching process (process of controlling the switching unit 21 to enter the second selection state Ss2 in the switching unit 21) in step S120, and determines whether or not the second external battery 3C exists in step S121. When the second external battery 3C does not exist, the controller 15B terminates a series of processes illustrated in FIG. 8 and FIG. 9. That is, in this case, the secondary battery 3 to be charged does not exist, and thus the charging relating control process is terminated.

In step S111, in a case where it is determined that the first external battery 3B exists, the controller 15B performs a charging rate acquisition process in step S301, that is, a process of acquiring a charging rate of the first external battery 3B. Then, the controller 15B controls the switching unit 21 to enter the second selection state Ss2 as a battery switching process in step S302, and determines whether or not the second external battery 3C exists in subsequent step S303.

In step S303, in a case where it is determined that the second external battery 3C exists, that is, in a case where the first external battery 3B and the second external battery 3C exist, the controller 15B performs a charging rate acquisition process in step S304, that is, a process of acquiring a charging rate of the second external battery 3C, and causes the process to proceed to step S305 (FIG. 9) to be described later.

Here, processes in a case where it is determined in step S303 that the second external battery 3C does not exist, that is, in a case where only the first external battery 3B exists are similar to the processes subsequent to step S114 in FIG. 4 (provided that, the processes in steps S113 and S114 relating to battery authentication are omitted in this example).

In addition, processes in a case where it is determined that the second external battery 3C exist in previous step S121 are similar to the processes subsequent to step S124 in FIG. 4 (provided that, the processes in steps S122 and S123 relating to battery authentication are omitted in this example).

As described above, in the third embodiment, as a chargeable secondary battery 3, in a case where only the internal battery 3A exists (in a case where a positive result is obtained in step S102), in a case where only the first external battery 3B exists (a negative result is obtained in step S303), and in a case where only the second external battery 3C exists (a negative result is obtained in step S121), similar processes as in the case in FIG. 4 are performed with respect to the secondary batteries 3 as a target.

Next, processes subsequent to step S305 as illustrated in FIG. 9 will be described.

In step S305, the controller 15B determines whether or not a charging rate of the second external battery 3C is higher than a charging rate of the first external battery 3B.

When the charging rate of the second external battery 3C is higher than the charging rate of the first external battery 3B, the controller 15B causes the process to proceed to step S306, and causes the process to proceed to step S314 in the opposite case.

In step S306, the controller 15B performs a similar charging display initiation process as in previous step S107 or the like, and performs a battery switching process in subsequent step S307, that is, a process of controlling the switching unit 21 to enter the first selection state Ss1. Then, in step S308, the controller 15B performs a charging initiation process relating to the first external battery 3B.

That is, in a case where the charging rate of the first external battery 3B is lower than that of the second external battery 3C, charging is performed preferentially from the first external battery 3B.

In step S309 subsequent to step S308, the controller 15B waits for completion of practical charging with respect to the first external battery 3B. That is, determination as to whether or not the charging rate of the first external battery 3B reaches the charging rate X is executed until a positive result is obtained.

Note that, in a case where the charging rate of the first external battery 3B is equal to or greater than the charging rate X in a state before initiation of charging in step S308, a positive result is obtained in step S309 immediately after execution of step S308.

In a case where the practical charging of the first external battery 3B is completed, the controller 15B suspends charging of the first external battery 3B in step S310, and executes a charging display termination process in subsequent step S311. Then, in step S312, the controller 15B determines whether or not practical charging of the second external battery 3C is completed. That is, the controller 15B determines whether or not practical charging of the second external battery 3C is determined as completion in advance in a process in step S317 to be described later.

Note that, examples of a case where the process in step S317 is executed before step S312 include a case where a process relating to practical charging of the second external battery 3C as a target is previously executed in correspondence with a situation in which the charging rate of the second external battery 3C is lower than or the same as that of the first external battery 3B.

In step S312, in the case of obtaining a negative result indicating that practical charging of the second external battery 3C is not completed, the controller 15B performs a battery switching process in step S313, that is, a process of controlling the switching unit 21 to enter the second selection state Ss2, and performs a charging display initiation process in step S314.

In addition, in previous step S305, in a case where it is determined that the charging rate of the second external battery 3C is not higher than that of the first external battery 3B, the controller 15B also performs the charging display initiation process in step S314.

In step S315 to step S317 subsequent to step S314, processes relating to similar practical charging as in steps S308 to S310 are performed with respect to the second external battery 3C as a target.

Note that, in this example, since the battery switching process in step S302 as illustrated in FIG. 8 is provided, at a point of time at which determination in step S305 is made, the second selection state Ss2 is obtained. Accordingly, the battery switching process for the second selection state Ss2 is not necessary between steps S305 to S315.

In correspondence with suspending of charging of the second external battery 3C in step S317, the controller 15B executes a charging display termination process in step S318, and in subsequent step S319, the controller 15B determines whether or not practical charging of the first external battery 3B is completed, that is, whether or not the positive result is obtained in step S309 in advance.

When practical charging of the first external battery 3B is not completed, the controller 15B performs a battery switching process in step S320, that is, a process of controlling the switching unit 21 to enter the first selection state Ss1, and causes the process to proceed to previous step S306.

Here, in a case where the charging rate of both the first external battery 3B and the second external battery 3C is less than the charging rate X, and the charging rate of the second external battery 3C is lower than that of the first external battery 3B, it is possible to realize an operation of performing practical charging of the first external battery 3B after suspending charging of the second external battery 3C in correspondence with practical charging of the second external battery 3C through the processes in steps S305→S314 to S319→S320→S306.

In addition, in a case where the charging rate of both the first external battery 3B and the second external battery 3C is less than the charging rate X, and the charging rate of the first external battery 3B is lower than that of the second external battery 3C, it is possible to realize an operation of performing practical charging of the second external battery 3C after suspending charging of the first external battery 3B in correspondence with practical charging of the first external battery 3B through the processes in steps S305→S306 to S312→S313→S314.

Next, in previous step S312, in a case where it is determined that practical charging of the second external battery 3C is completed, in step S321, the controller 15B executes a charging display initiation process in step S321. Then, the controller 15B initiates charging of the first external battery 3B in step S322, and waits for completion of full charging of the first external battery 3B in subsequent step S323 (executes determination as to whether or not the first external battery 3B is fully charged until a positive result is obtained).

In a case where full charging of the first external battery 3B is completed, the controller 15B executes charging display termination in step S324, and determines whether or not the second external battery 3C is fully charged in step S325. That is, the controller 15B determines whether or not the positive result is obtained in advance in a process in step S329 to be described later.

When the second external battery 3C is fully charged, the controller 15B terminates a series of processes illustrated in FIG. 8 and FIG. 9. That is, the charging relating control process is terminated in correspondence with full charging of both the first external battery 3B and the second external battery 3C.

In a case where the second external battery 3C is not fully charged, the controller 15B performs a battery switching process in step S326, that is, a process of controlling the switching unit 21 to enter the second selection state Ss2, and performs a charging display initiation process in step S327.

In addition, even in the case of obtaining the positive result indicating that completion of practical charging of the first external battery 3B in previous step S319, the controller 15B performs the charging display initiation process in step S327.

In step S328 subsequent to step S327, the controller 15B initiates charging of the second external battery 3C, and waits for completion of full charging of the second external battery 3C in subsequent step S329 (determination as to whether or not the second external battery 3C is fully charged is executed until the positive result is obtained).

In correspondence with determination as completion of full charging of the second external battery 3C in step S329, the controller 15B executes a charging display termination process in step S330, and determines whether or not the first external battery 3B is fully charged in subsequent step S331, that is, determines whether or not the positive result is obtained in advance in the process in step S323.

When the first external battery 3B is not fully charged, the controller 15B performs a battery switching process in step S332, that is, a process of controlling the switching unit 21 to enter the first selection state Ss1. Then, the controller 15B causes the process to proceed to previous step S321.

On the other hand, when the first external battery 3B is fully charged, the controller 15B terminates a series of processes illustrated in FIG. 8 and FIG. 9.

In a case where practical charging of the secondary battery 3 is completed in the order of the first external battery 3B and the second external battery 3C, control of fully charging the secondary battery 3 is performed in the order of the second external battery 3C and the first external battery 3B through the processes in steps S319→S327 to S331→S332→S321.

In addition, in a case where practical charging of the secondary battery 3 is completed in the order of the second external battery 3C and the first external battery 3B, control of fully charging the secondary battery 3 is performed in the order of the first external battery 3B and the second external battery 3C through the processes in steps S312→S321 to S325→S326→S327.

According to this, when fully charging the secondary batteries 3 after practical charging, it is possible to realize a reduction in the number of times of the battery switching process.

Note that, in the charging system according to the second embodiment as described above, charging with respect to the internal battery 3A is possible in a state in which connection of the external device 2A is established. In this case, with respect to all of the internal battery 3A, the first external battery 3B, and the second external battery 3C, it is possible to perform control of sequentially initiating charging preferentially from the secondary battery 3 of which the charging rate is low.

In addition, in a case where charging of the internal battery 3A is possible in a state in which connection of the external device 2A is established as in the second embodiment, it is possible to include the internal battery 3A in a control target of the practical charging in combination with the external batteries.

As described above, in the third embodiment, in a case where a plurality of the secondary batteries 3 exists as a charging target, charging by the charging unit 11 is executed preferentially from a secondary battery of which a charging rate is low.

According to this, it is possible to perform charging sequentially from a secondary battery 3 of which a charging rate is lower, that is, a secondary battery 3 of which charging efficiency is assumed to be higher, and thus it is possible to efficiently charge the plurality of secondary batteries 3.

In addition, in the third embodiment, in a case where a plurality of the secondary batteries 3 of which the charging rate is less than the charging rate X exists as a charging target secondary battery 3, in correspondence with charging of one secondary battery 3 up to the charging rate X, charging of the secondary battery 3 is suspended, and another secondary battery 3 is charged up to the charging rate X.

According to this, it is possible to consume a relatively long time necessary for charging in a charging rate region up to full charging as a practical charging time (time taken to perform charging with high charging efficiency up to the charging rate X) in the other secondary battery 3.

According to this, an improvement of charging efficiency in a case where the plurality of secondary batteries 3 is regarded as one battery is realized, and it is possible to realize operational lifespan extension of the electronic apparatus 1 with respect to a constant charging time.

In addition, in the third embodiment, charging up to full charging of the one secondary battery 3 of which charging is suspended is initiated under a condition in which the charging rate of the other secondary battery 3 becomes equal to or greater than the charging rate X.

According to this, in the case of having a time margin, charging up to full charging is performed, and thus it is possible to realize operational lifespan extension of the electronic apparatus 1.

<4. Display Example of Charging Destination Battery>

Note that, although not particularly noted, with regard to charging display in the display unit 13, lighting patterns of a lighting tool may be set to be different from each other in correspondence with the type of the secondary battery 3.

Hereinafter, on the assumption that three secondary batteries 3 can be charging destinations as exemplified in the embodiments, description will be given of an example in which display is distinguished in a manner that depends on the type of the secondary batteries 3 as charging destinations.

In this example, the number of continuous flickers of a lighting pattern according to a first lighting time length of the lighting tool is made different in correspondence with whether the secondary battery 3 that is being charged by the charging unit 11 is the secondary battery 3 mounted in the battery mounting unit 1a or the secondary battery 3 mounted in the external device 2 (or 2A).

In addition, in this example, on the assumption that the external device 2 (2A) can mount a plurality of the secondary batteries 3 therein as exemplified in the embodiments, the number of continuous flickers of a lighting pattern according to a second lighting time length of the lighting tool is made different in correspondence with which of the plurality of secondary batteries 3 is the secondary battery 3 that is being charged by the charging unit 11.

Here, the second lighting time length and the first lighting time length are lighting time lengths different from each other, and in this example, a relationship of "first lighting time length>second lighting time length" is set.

Hereinafter, a lighting pattern according to the first lighting time length is schematically noted as "—", and a lighting pattern according to the second lighting time length is schematically noted as "–".

Note that, the following control is control that is performed by the controller 15 (or 15A or 15B) with respect to the display unit 13.

In charging with respect to the internal battery 3A, control is performed so that the lighting tool repeats a single flicker of the lighting pattern "—" according to the first lighting time length. In this case, the number of continuous flickers of the lighting pattern according to the first lighting time length, which indicates that the secondary battery 3 as a charging destination is the secondary battery 3 mounted in the battery mounting unit 1a, is "1".

In charging with respect to the first external battery 3B, control is performed so that the lighting tool repeats a combination lighting pattern of "———–" in which a single flicker of the lighting pattern "–" according to the second lighting time length is subsequently added to a lighting pattern of "——" in which the lighting pattern according to the first lighting time length continuously flickers twice.

In this case, the number of continuous flickers of the lighting pattern according to the first lighting time length, which indicates that the secondary battery 3 as a charging destination is the secondary battery 3 mounted in the external device 2 (or 2A), is "2". In addition, the number of continuous flickers of the lighting pattern according to the second lighting time length, which indicates that the secondary battery 3 as a charging destination is the secondary battery 3 mounted in the external device 2 (or 2A), is "1".

In charging with respect to the second external battery 3C, control is performed so that the lighting tool repeats a combination lighting pattern of "———––" in which a pattern of "––" in which the lighting pattern "–" according to the second lighting time length is continuously flickered twice is subsequently added to a lighting pattern of "———" in which the lighting pattern according to the first lighting time length continuously flickers twice.

In this case, the number of continuous flickers of the lighting pattern according to the first lighting time length is "2", and the number of continuous flickers of the lighting pattern according to the second lighting time length is "2".

For example, due to the lighting control of the lighting tool as described above, it is possible to appropriately distinguish display to indicate the secondary battery 3 as a charging destination is which of the internal battery 3A, the first external battery 3B, and the second external battery 3C.

Here, the battery mounting unit 1a may have a configuration capable of mounting a plurality of the secondary batteries 3 therein. In this case, with regard to the plurality of secondary batteries 3 mounted in the battery mounting unit 1a, the number of continuous flickers of the lighting pattern according to the second lighting time length may be made different in correspondence with which secondary battery 3 is the charging destination.

For example, it is assumed that two pieces of the secondary batteries 3 can be mounted in the battery mounting unit 1a, and in light of the above-described example, flickering of a combination lighting pattern of "———" is repeated in charging with respect to one secondary battery 3 in the battery mounting unit 1a, and flickering of a combination lighting pattern of "———" is repeated in charging with respect to the other secondary battery 3.

In the above-described display example, the number of continuous flickers of the lighting pattern according to the first lighting time length of the lighting tool is made different in correspondence with whether the secondary battery 3 that is being charged by the charging unit 11 is the secondary battery 3 mounted in the battery mounting unit 1a or the secondary battery 3 mounted in the external device 2 (or 2A).

According to this, when distinguishing display to indicate that the secondary battery 3 as a charging destination is which battery on an electronic apparatus side or an external device side, and thus it is not necessary to provide a plurality of lighting tools. Accordingly, a reduction in the number of parts of the electronic apparatus 1 (or 1A) is realized, and thus it is possible to realize a reduction in the cost thereof.

In addition, in the above-described display example, a plurality of the secondary batteries 3 can be mounted in any one of the battery mounting unit 1A and the external device 2 (or 2A), and the number of continuous flickers of the lighting pattern according to the second lighting time length of the lighting tool is made different in correspondence with which of the plurality of secondary batteries 3 is the secondary battery 3 that is being charged by the charging unit 11.

According to this, in a case where the plurality of secondary batteries 3 can be mounted in any one of the electronic apparatus 1 or the external device 2 (or 2A), when distinguishing display to indicate which secondary battery 3 is being charged among the plurality of secondary batteries 3, it is not necessary to provide a plurality of lighting tools.

Accordingly, a reduction in the number of parts of the electronic apparatus 1 (or 1A) is realized, and thus it is possible to realize a reduction in the cost thereof.

Note that, in the case of a configuration in which the internal battery 3A cannot be mounted in the battery mounting unit 1a during connection of the external device as in the first and third embodiments, a user can understand that the internal battery 3A cannot be charged during connection of the external device.

Here, in this case, display of the secondary battery 3 as a charging destination may be distinguished only with respect to the secondary batteries 3 mounted on the external device side.

In addition, a method of distinguishing display of the secondary battery 3 as a charging destination is not limited to the above-described method in which the lighting pattern of the lighting tool is made different, and for example, it is possible to realize the display distinguishment by providing a display panel such as a liquid crystal panel and an organic electroluminescence (EL) panel in the display unit 13 and by making a display pattern on the display panel be different.

<5. Summary of Embodiments>

As described above, a first electronic apparatus (1 or 1A) as an embodiment includes: a battery mounting unit (1a) in which a secondary battery (3) is mounted; a charging unit (111) that charges the secondary battery on the basis of external input power; and a connection unit (12 or 12A) that establishes electrical connection of an external device (2 or 2A) in which a secondary battery is mounted. The secondary battery mounted in the external device is charged by the charging unit through the connection unit.

According to this, when charging the secondary battery of the external device, it is not necessary to provide a charging unit in the external device.

According to this, a reduction in the number of parts of the external device is realized, and thus it is possible to realize a reduction in the cost of the external device.

In addition, a space for disposing the charging unit is not necessary, and thus an improvement of the degree of freedom in design of the external device is realized.

In addition, the first electronic apparatus as the embodiment includes a power receiving unit (power feeding unit 16 or the like) that receives power supply from the secondary battery mounted in the external device.

According to this, the electronic apparatus can operate on the basis of the secondary battery mounted in the external device.

That is, it is possible to use the external device an external battery of the electronic apparatus, and thus it is possible to realize operational lifespan extension of the electronic apparatus.

In addition, in the first electronic apparatus as the embodiment, charging is performed with respect to the secondary battery mounted in the external device to be attachable and detachable by a user.

When the secondary battery is attachable and detachable, even in a case where a residual amount of a secondary battery that is being used does not exist, it is possible to continuously use the electronic apparatus by substituting the secondary battery with a charged secondary battery.

According to this, it is possible to realize operational lifespan extension of the electronic apparatus.

In addition, in the first electronic apparatus as the embodiment, the external device is capable of mounting a plurality of the secondary batteries therein, and charging is performed with respect to the plurality of secondary batteries by the charging unit.

According to this, at least two or more batteries can be used in an operation of the electronic apparatus.

Accordingly, it is possible to realize operational lifespan extension of the electronic apparatus.

In addition, in the first electronic apparatus as the embodiment, the secondary battery mounted in the battery mounting unit and the secondary battery mounted in the external device are selectively charged by the charging unit.

According to this, it is possible to distinguish charging of the secondary battery on the electronic apparatus side and charging of the secondary battery on the external device side by a common charging unit that is provided on the electronic apparatus side.

Accordingly, it is not necessary to provide the charging unit in the external device, and thus it is possible to realize a reduction in the number of parts of the external device.

In addition, in the first electronic apparatus as the embodiment, each of the battery mounting unit and the external device is capable of mounting the secondary battery therein in an attachable and detachable manner, and the battery mounting unit is capable of mounting a secondary battery according to the same shape and the same size as in the secondary battery mounted in the external device.

According to this, it is possible to realize an improvement of the degree of freedom in a battery use pattern, such as a pattern in which the secondary battery mounted in the external device is used in the electronic apparatus and a pattern in which the secondary battery mounted in the electronic apparatus is used in a state of being mounted in the external device.

Accordingly, it is possible to perform an efficient operation of the electronic apparatus corresponding to necessity and non-necessity of connection of the external device, a battery residual amount of the secondary battery, or the like in accordance with a user.

In addition, in the first electronic apparatus as the embodiment, the electronic apparatus is set as an imaging apparatus from which the external device that functions as an extension grip is attachable and detachable.

According to this, the extension grip can be used as an external battery of the imaging apparatus.

Accordingly, with regard to an imaging system in which the extension grip is connected to the imaging device, it is not necessary to provide the external battery separately from the extension grip, and thus a reduction of constituent elements and a reduction in size of system constituent elements are realized when realizing operational lifespan extension.

In addition, the first electronic apparatus as the embodiment includes a charging control unit (controller 15, 15A, or 15B) that controls a charging operation of the secondary battery by the charging unit, and the charging control unit performs an authentication process relating to the secondary battery, and controls the charging operation on the basis of a result of the authentication process.

According to this, it is possible to prevent a secondary battery other than a specific secondary battery (for example, an irregular product) from being used.

Accordingly, it is possible to realize an improvement of stability.

In addition, the first electronic apparatus as the embodiment includes a charging control unit (controller 15B) that controls a charging operation of the secondary battery by the charging unit, and in a case where a plurality of the secondary batteries exists as a charging target, the charging control unit causes the charging unit to execute charging preferentially from a secondary battery of which a charging rate is low.

According to this, it is possible to perform charging sequentially from a secondary battery of which a charging rate is low, that is, a secondary battery of which charging efficiency is assumed to be higher.

Accordingly, it is possible to efficiently charge the plurality of secondary batteries.

In addition, even when arbitrarily mounting a secondary battery in the battery mounting unit or the external device, charging is automatically performed in an appropriate order, and thus an improvement of convenience for a user is realized.

In addition, the first electronic apparatus as the embodiment includes a charging control unit (controller 15B) that controls a charging operation of the secondary battery by the charging unit, and in a case where a plurality of the secondary batteries of which a charging rate is less than a predetermined charging rate less than full charging exists as a charging target secondary battery, in correspondence with charging of one secondary battery up to the predetermined charging rate, the charging control unit suspends charging of the secondary battery, and charges another secondary battery up to the predetermined charging rate.

Typically, in a secondary battery, charging efficiency is lowered in a charging rate region up to full charging exceeding a predetermined charging rate. That is, a long charging time is taken in the charging rate region up to the full charging exceeding the predetermined charging rate. According to the above-described configuration, it is possible to consume a relatively long time necessary for charging in the charging rate region up to the full charging as a charging time up to a predetermined charging rate in another secondary battery, that is, as a charging time of a charging rate region with high charging efficiency.

Accordingly, an improvement of charging efficiency in a case where the plurality of secondary batteries are regarded as one battery is realized, and it is possible to realize operational lifespan extension of the electronic apparatus with respect to a constant charging time.

In addition, in the first electronic apparatus as the embodiment, the charging control unit initiates charging of the one secondary battery, in which charging is suspended, up to the full charging under a condition in which the charging rate of the other secondary battery becomes equal to or greater than the predetermined charging rate.

According to this, in the case of having a time margin, charging up to the full charging is performed, Accordingly, it is possible to realize operational lifespan extension of the electronic apparatus.

In addition, the first electronic apparatus as the embodiment includes a display unit (13) that performs display with respect to information indicating a charging operation state of the charging unit.

According to this, it is not necessary to provide a display unit for showing the charging operation state to a user in the external device.

Accordingly, a reduction in the number of parts of the external device is realized, and thus it is possible to realize a reduction in the cost of the external device.

In addition, the first electronic apparatus as the embodiment includes a display control unit (controller 15, 15A, or 15B), the display unit includes a lighting tool, and the display control unit makes a lighting pattern of the lighting tool be different in correspondence with a type of the secondary battery that is being charging by the charging unit.

According to this, when distinguishing display in a manner that depends on the type of the secondary batteries as charging destinations, it is not necessary to provide a plurality of the lighting tools.

Accordingly, a reduction in the number of parts of the electronic apparatus is realized, and thus it is possible to realize a reduction in the cost of the electronic apparatus.

In addition, in the first electronic apparatus as the embodiment, the display control unit makes the number of continuous flickers of a lighting pattern according to a first lighting time length of the lighting tool be different in correspondence with whether the secondary battery that is being charged by the charging unit is the secondary battery mounted in the battery mounting unit or the secondary battery mounted in the external device.

According to this, when distinguishing display of the secondary batteries as charging destinations between the electronic apparatus side and the external device side, it is not necessary to provide a plurality of the lighting tools.

Accordingly, a reduction in the number of parts of the electronic apparatus is realized, and thus it is possible to realize a reduction in the cost thereof.

In addition, in the first electronic apparatus as the embodiment, any one of the battery mounting unit and the external device is capable of mounting a plurality of the secondary batteries therein, and the display control unit makes the number of continuous flickers of a lighting pattern according to a second lighting time length of the lighting tool be different in correspondence with which of the plurality of secondary batteries is the secondary battery that is being charged by the charging unit.

According to this, in a case where any one of the electronic apparatus and the external device is capable of mounting the plurality of secondary batteries therein, when distinguishing display to indicate which secondary battery is being charged among the plurality of secondary batteries, it is not necessary to provide a plurality of lighting tools.

Accordingly, a reduction in the number of parts of the electronic apparatus is realized, and thus it is possible to realize a reduction in the cost thereof.

In addition, in the first electronic apparatus (1) as the embodiment, the connection unit (12) establishes electrical connection of the external device by a terminal common to the secondary battery mounted in the battery mounting unit (2).

According to this, it is not necessary to provide a configuration for switching the secondary battery as a charging destination in the electronic apparatus.

Accordingly, a reduction in the number of parts of the electronic apparatus is realized, and thus it is possible to realize a reduction in the cost thereof.

In addition, in the first electronic apparatus (1A) as the embodiment, the connection unit (12A) includes terminals (charging/power feeding terminals Tcf and Tcg) for charging of the secondary battery mounted in the external device (2A), and the terminals for charging are set as a terminal different from a terminal (charging/power feeding terminal Tca) for charging of the secondary battery mounted in the battery mounting unit.

According to this, it is not necessary to provide a configuration for switching the secondary battery as a charging destination in the external device.

Accordingly, a reduction in the number of parts of the external device is realized, and thus it is possible to realize a reduction in the cost thereof.

In addition, it is not necessary to remove the secondary battery from the battery mounting unit when connecting the external device to the electronic apparatus.

Accordingly, even when establishing connection of the external device, the secondary battery mounted in the battery mounting unit can be used in an operation of the electronic apparatus, and it is possible to realize operational lifespan extension of the electronic apparatus.

In addition, in the first electronic apparatus (1 or 1A) as the embodiment, operation information of an operator provided in the external device is received through the connection unit (12 or 12A).

According to this, a user can operate the electronic apparatus by the operator provided in the external device. Since the operator increases, it is possible to realize an improvement of operability of the electronic apparatus.

In addition, a second electronic apparatus (external device 2 or 2A) as the embodiment includes: a battery mounting unit (2d) in which a secondary battery is mounted; and a connection unit (terminals Tdc, Tcc, and Tgc, or terminals Tdh, Tch, Tgh, Tdi, Tci, and Tgi) that is electrically connected to an imaging apparatus (electronic apparatus 1 or 1A) in which the secondary battery is mounted. The secondary battery mounted in the battery mounting unit is charged by a charging unit (11) that is provided in the imaging apparatus and charges a secondary battery on the basis of external input power through the connection unit.

According to this, when charging the secondary battery mounted in the battery mounting unit of the second electronic apparatus (corresponding to the external device in the first electronic apparatus), it is not necessary to provide the charging unit in the second electronic apparatus.

Accordingly, a reduction in the number of parts is realized, and thus it is possible to realize a reduction in the cost.

In addition, a space for disposing the charging unit is not necessary, and thus it is possible to realize an improvement of the degree of freedom in design.

Note that, the effects described in this specification are illustrative only without limitation, and other effects may be present.

<6. Modification Example>

The present technology is not limited to the above-described specific examples, and various modification examples are considered.

For example, for example, in addition to a lithium ion battery, another secondary battery such as a nickel-hydrogen battery and a nickel-cadmium battery is also applicable as the secondary battery. In addition, the same shape and the same size between the secondary battery mounted in the battery mounting unit and the secondary battery mounted in the external battery are not essential.

In addition, one secondary battery may be mounted in the external device. In this case, when the secondary battery is set as a secondary battery having capacity larger than that of the internal battery, even in a case where the internal battery cannot be mounted in the battery mounting unit when establishing connection of the external device as in the first or third embodiment, it is possible to realize operational lifespan extension of the electronic apparatus through connection of the external device.

In addition, the electronic apparatus of the present technology are appropriately applicable to various electronic apparatuses such as a voice reproduction apparatus and a recording apparatus (voice collection apparatus) in addition to the imaging apparatus. The electronic apparatus according to the present technology is suitable for application to a portable apparatus.

In addition, the external device is not limited to a device that functions as an extension grip.

<7. Application Example>

[7-1. First Application Example]

The technology according to the present disclosure is applicable to various products. For example, the technology according to the preset disclosure may be applied to an endoscopic operating system.

Figure 10:
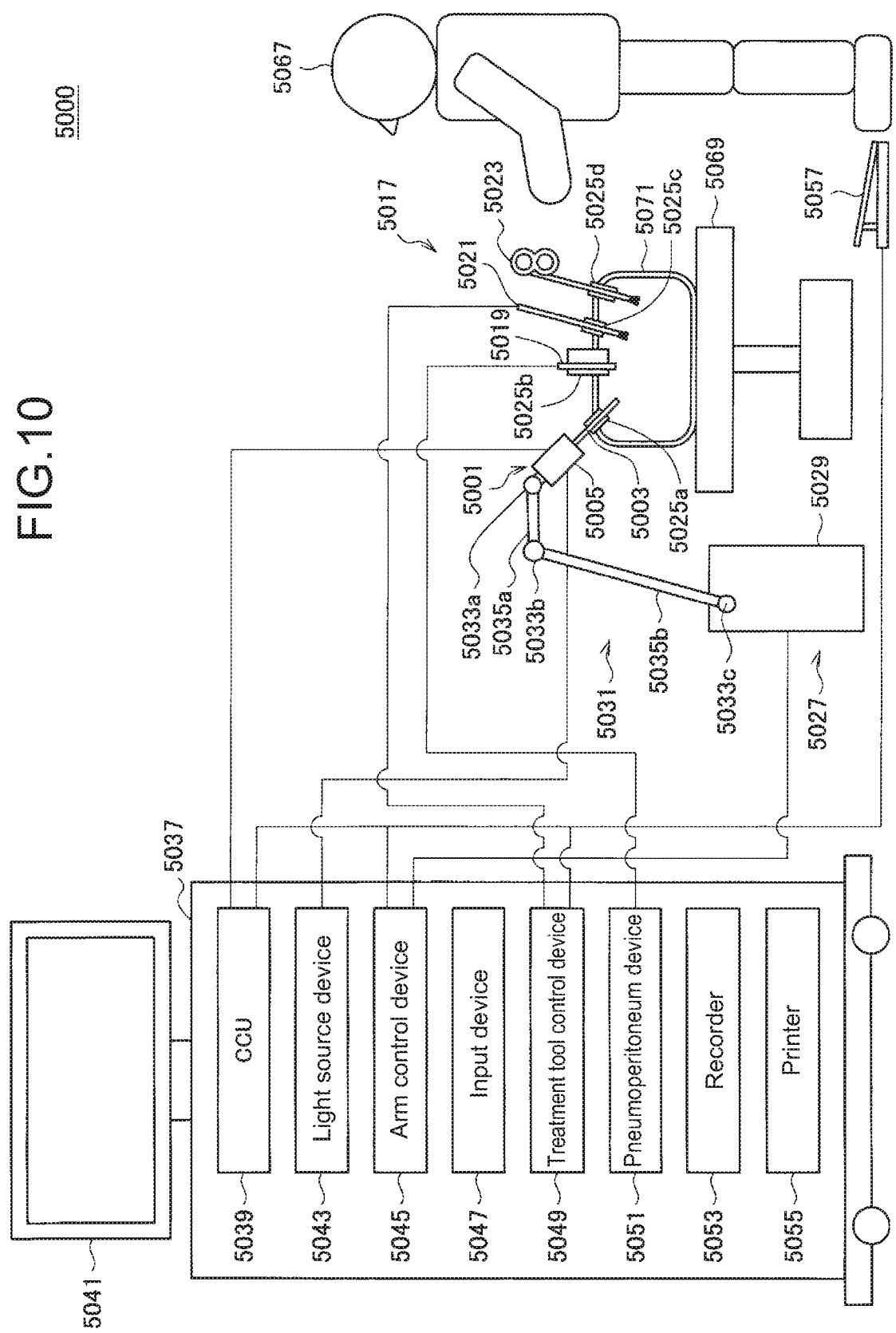
FIG. 10 is a view illustrating an example of a schematic configuration of an endoscopic operating system.

FIG. 10 is a diagram illustrating an example of a schematic configuration of an endoscopic operating system 5000 to which the technology according to the present disclosure can be applied. In FIG. 10, a state in which an operator (a doctor) 5067 performs an operation on a patient 5071 on a patient bed 5069 using the endoscopic operating system 5000 is illustrated. As illustrated in the drawing, the endoscopic operating system 5000 includes an endoscope 5001, other operating tools 5017, a support arm device 5027 that supports the endoscope 5001, and a cart 5037 on which various devices for an endoscopic operation are mounted.

In an endoscopic operation, a plurality of tubular puncturing tools, which are called trocars 5025a to 5025d, puncture an abdominal wall instead of cutting and opening the abdominal wall. Then, a lens-barrel 5003 of the endoscope 5001 or the other operating tools 5017 are inserted into a coelom of the patient 5071 from the trocars 5025a to 5025d. In the illustrated example, a pneumoperitoneum tube 5019, an energy treatment tool 5021, and a forceps 5023 are inserted into the coelom of the patient 5071 as the other operating tools 5017. In addition, the energy treatment tool 5021 is a treatment tool that is used to perform cutting and separation of a tissue, sealing of a blood vessel, or the like using a high-frequency current or ultrasonic vibration. Here, the operating tools 5017 illustrated in the drawing are merely examples and, for example, various operating tools which are generally used in an endoscopic operation such as tweezers and a retractor may be used as the operating tools 5017.

An image of an operating portion site in the coelom of the patient 5071 which is captured using the endoscope 5001 is displayed on a display device 5041. The operator 5067 performs treatment such as cutting of an affected part using the energy treatment tool 5021 or the forceps 5023 while viewing the image of the operating site displayed on the display device 5041 in real time. Note that, although not illustrated, the pneumoperitoneum tube 5019, the energy treatment tool 5021, and the forceps 5023 are supported by the operator 5067, an assistant, or the like during the operation.

(Support Arm Device)

The support arm device 5027 includes an arm portion 5031 that extends from a base portion 5029. In the illustrated example, the arm portion 5031 includes joints 5033a, 5033b, and 5033c and links 5035a and 5035b, and is driven under the control of an arm control device 5045. The endoscope 5001 is supported by the arm portion 5031 and the position and the posture thereof are controlled. Accordingly, stable fixing of the position of the endoscope 5001 can be realized.

(Endoscope)

The endoscope 5001 includes the lens-barrel 5003 of which a region with a predetermined length from the tip end thereof is inserted into the coelom of the patient 5071 and a camera head 5005 that is connected to the base end of the lens-barrel 5003. In the illustrated example, the endoscope 5001 is illustrated as a so-called rigid endoscope including a rigid lens-barrel 5003, but the endoscope 5001 may include a so-called flexible endoscope including a flexible lens-barrel 5003.

An opening to which an objective lens is fitted is provided at the tip end of the lens-barrel 5003. A light source unit 5043 is connected to the endoscope 5001, and light generated by the light source unit 5043 is guided to the tip end of the lens-barrel by a light guide extending in the lens-barrel 5003 and is applied to an observation target in the coelom of the patient 5071 through the objective lens. Note that, the endoscope 5001 may be a direct-viewing mirror, a perspective-viewing mirror, or a side-viewing mirror.

An optical system and an imaging element are provided in the camera head 5005, and reflected light (observation light) from the observation target is condensed to the imaging element by the optical system. The observation light is photoelectrically converted by the imaging element and an electrical signal corresponding to the observation light, that is, an image signal corresponding to an observation image, is generated. The image signal is transmitted as RAW data to a camera control unit (CCU) 5039. Note that, a function of adjusting a magnification and a focal length by appropriately driving the optical system is mounted in the camera head 5005.

Note that, a plurality of imaging elements may be provided in the camera head 5005 to cope with, for example, stereoscopic vision (3D display) and the like. In this case, a plurality of relay optical systems is provided in the lens-barrel 5003 to guide observation light to the plurality of imaging elements.

(Various Devices Mounted on Cart)

The CCU 5039 is constituted by a central processing unit (CPU), a graphics processing unit (GPU), or the like and collectively controls the operations of the endoscope 5001 and the display device 5041. Specifically, with respect to an image signal received from the camera head 5005, the CCU 5039 performs various kinds of image processing for displaying an image based on the image signal, for example, development processing (demosaic processing). The CCU 5039 provides the image signal subjected to the image processing to the display device 5041. In addition, the CCU 5039 transmits a control signal to the camera head 5005 and controls driving thereof. The control signal may include information regarding imaging conditions such as a magnification or a focal length.

The display device 5041 displays an image based on the image signal subjected to the image processing by the CCU 5039 under the control of the CCU 5039. For example, when the endoscope 5001 copes with image capturing with a high resolution such as 4K (3840 (the number of horizontal pixels)×2160 (the number of vertical pixels)) or 8K (7680 (the number of horizontal pixels)×4320 (the number of vertical pixels)) and/or when the endoscope 5001 copes with 3D display, a display device that can display an image with a high resolution and/or a display device that can display a 3D image can be used as the display device 5041. When the endoscope 5001 copes with image capturing with a high resolution such as 4K or 8K, a display device with a size of 55 inches or larger can be used as the display device 5041, whereby it is possible to further obtain a sense of immersion. In addition, a plurality of display devices 5041 which is different in resolution and a size may be provided in correspondence with usage.

For example, the light source unit 5043 is constituted by a light source such as a light emitting diode (LED), and supplies irradiation light that is used to capture an image of an operating site to the endoscope 5001.

The arm control device 5045 is constituted, for example, by a processor such as a CPU and operates in accordance with a predetermined program such that driving of the arm portion 5031 of the support arm device 5027 is controlled in accordance with a predetermined control method.

The input device 5047 is an input interface for the endoscopic operating system 5000. A user can perform input of various pieces of information or input of an instruction to the endoscopic operating system 5000 through the input device 5047. For example, a user inputs various pieces of information regarding an operation such as body information of a patient or information regarding an operation method through the input device 5047. In addition, for example, a user inputs an instruction to drive the arm portion 5031, an instruction to change imaging conditions (such as a type of irradiation light, a magnification, and a focal length) using the endoscope 5001, an instruction to drive the energy treatment tool 5021, and the like through the input device 5047.

The type of the input device 5047 is not limited and the input device 5047 may include various known input devices. For example, a mouse, a keyboard, a touch panel, a switch, a foot switch 5057, and/or a lever can be used as the input device 5047. When a touch panel is used as the input device 5047, the touch panel may be provided on a display surface of the display device 5041.

Alternatively, for example, the input device 5047 is a device that is worn by a user such as an eyeglass wearable device or a head mounted display (HMD), and various inputs are performed in correspondence with a user's gesture or visual line which is detected by the device. In addition, the input device 5047 includes a camera that can detect a user's movement, and various inputs are performed in correspondence with a user's gesture or visual line detected from an image captured by the camera. Moreover, the input device 5047 includes a microphone that can collect a user's sound and various inputs are performed in accordance with sound through the microphone. In this manner, by constituting the input device 5047 such that various pieces of information are input in a noncontact manner, particularly a user (for example, the operator 5067) in a clean area can operate a device in an unclean area in a noncontact manner. In addition, since a user can operate a device without detaching a hand from a carried operating tool, it is possible to improve convenience for a user.

A treatment tool control device 5049 controls driving of the energy treatment tool 5021 for cautery or cutting of a tissue, sealing of a blood vessel, or the like. A pneumoperitoneum device 5051 supplies gas to the coelom through the pneumoperitoneum tube 5019 to expand the coelom of the patient 5071 for the purpose of securement of a visual field and securement of a work space of an operator using the endoscope 5001. A recorder 5053 is a device that can record various pieces of information regarding an operation. A printer 5055 is a device that can print various pieces of information regarding an operation in various forms such as text, image, or graph.

Characteristic configurations of the endoscopic operating system 5000 will be described below in more details.

(Support Arm Device)

The support arm device 5027 includes a base portion 5029 serving as a mount and an arm portion 5031 extending from the base portion 5029. In the illustrated example, the arm portion 5031 includes the plurality of joints 5033a, 5033b, and 5033c and the plurality of links 5035a and 5035b connected to the joint 5033b, but the configuration of the arm portion 5031 is simplified and illustrated in FIG. 10 for the purpose of simplification. Actually, the shapes, the numbers, and the arrangements of the joints 5033a to 5033c and the links 5035a and 5035b, the direction of rotation axes of the joints 5033a to 5033c, and the like can be appropriately set such that the arm portion 5031 has a desired degree of freedom. For example, the arm portion 5031 can be suitably configured to have six degrees of freedom or more. Accordingly, since the endoscope 5001 can be freely moved in a movable range of the arm portion 5031, the lens-barrel 5003 of the endoscope 5001 can be inserted into the coelom of the patient 5071 in a desired direction.

Actuators are provided in the joints 5033a to 5033c, and the joints 5033a to 5033c are configured to rotate around predetermined rotation axes by driving the actuators. By controlling the driving of the actuators using the arm control device 5045, the rotation angles of the joints 5033a to 5033c are controlled and driving of the arm portion 5031 is controlled. Accordingly, control of the position and posture of the endoscope 5001 can be realized. At this time, the arm control device 5045 can control driving of the arm portion 5031 using various known control methods such as force control or position control.

For example, by causing the operator 5067 to appropriately perform operation inputs through the input device 5047 (which includes the foot switch 5057), driving of the arm portion 5031 may be appropriately controlled by the arm control device 5045 and the position and posture of the endoscope 5001 may be controlled in correspondence with the operation inputs. Through this control, the endoscope 5001 at the tip end of the arm portion 5031 can be moved from an arbitrary position to an arbitrary position and can be fixedly supported at the moved position. Note that, the arm portion 5031 may be operated in a so-called master-slave system. In this case, the arm portion 5031 can be remotely operated by a user through the input device 5047 which is installed in a place distant from an operation room.

In addition, when force control is used, the arm control device 5045 may perform so-called power assist control for receiving an external force from a user and driving the actuators of the joints 5033a to 5033c such that the arm portion 5031 moves smoothly along the external force. Accordingly, a user can move the arm portion 5031 with a relative small force when the user directly touches the arm portion 5031 and moves the arm portion 5031. Accordingly, it is possible to more intuitively move the endoscope 5001 with a simpler operation and to improve convenience for a user.

Here, in general, in an endoscopic operation, the endoscope 5001 is supported by a doctor who is called scopist. In contrast, since the position of the endoscope 5001 can be more reliably fixed without using a human hand by using the support arm device 5027, it is possible to stably acquire an image of an operating site and to smoothly perform an operation.

Note that, the arm control device 5045 may not be necessarily provided in the cart 5037. In addition, the arm control device 5045 may not be necessarily constituted by a single device. For example, the arm control device 5045 may be provided in each of the joints 5033a to 5033c of the arm portion 5031 of the support arm device 5027, or driving control of the arm portion 5031 may be realized in cooperation of a plurality of arm control devices 5045.

(Light Source Unit)

The light source unit 5043 supplies irradiation light when capturing an image of an operating site to the endoscope 5001. The light source unit 5043 is constituted, for example, by an LED, a laser beam source, or a white light source which is a combination thereof. At this time, when a white light source is constituted in combination of RGB laser beam sources, output intensity and an output time of each color (each wavelength) can be controlled with high accuracy and thus white balance adjustment of a captured image in the light source unit 5043 can be performed. In addition, in this case, by irradiating an observation target with laser beams from the RGB laser light sources in a time division manner and controlling driving of the imaging element of the camera head 5005 in synchronization with the irradiation time, images corresponding to RGB colors can also be captured in a time division manner. According to this method, it is possible to obtain a color image without providing a color filter in the imaging element.

In addition, driving of the light source unit 5043 may be controlled such that the intensity of output light thereof varies every predetermined time. By controlling driving of the imaging element of the camera head 5005 in synchronization with a variation time of the light intensity such that images are acquired in a time division manner and combining the acquired images, it is possible to generate an image with a high dynamic range without black defects and halation.

In addition, the light source unit 5043 may be configured to supply light of a predetermined wavelength band corresponding to special light observation. In the special light observation, so-called narrow-band optical observation (narrow band imaging) of capturing an image of a predetermined tissue such as a blood vessel of a mucous membrane surface layer is performed, for example, by applying light of a narrower band than that of irradiation light (that is, white light) at the time of normal observation using wavelength dependency of light absorption in a body tissue. Alternatively, in the special light observation, fluorescent observation of acquiring an image using fluorescent light generated by irradiation with excitation light may be performed. In the fluorescent observation, irradiating a body tissue with excitation light and observing fluorescent light from the body tissue (auto-fluorescence observation), or locally injecting a reagent such as indocyanine green (ICG) into a body tissue and irradiating the body tissue with excitation light corresponding to a fluorescence wavelength of the reagent to acquire a fluorescent image, or the like can be performed. The light source unit 5043 can be configured to supply narrow-band light and/or excitation light corresponding to the special light observation.

(Camera Head and CCU)

Figure 11:
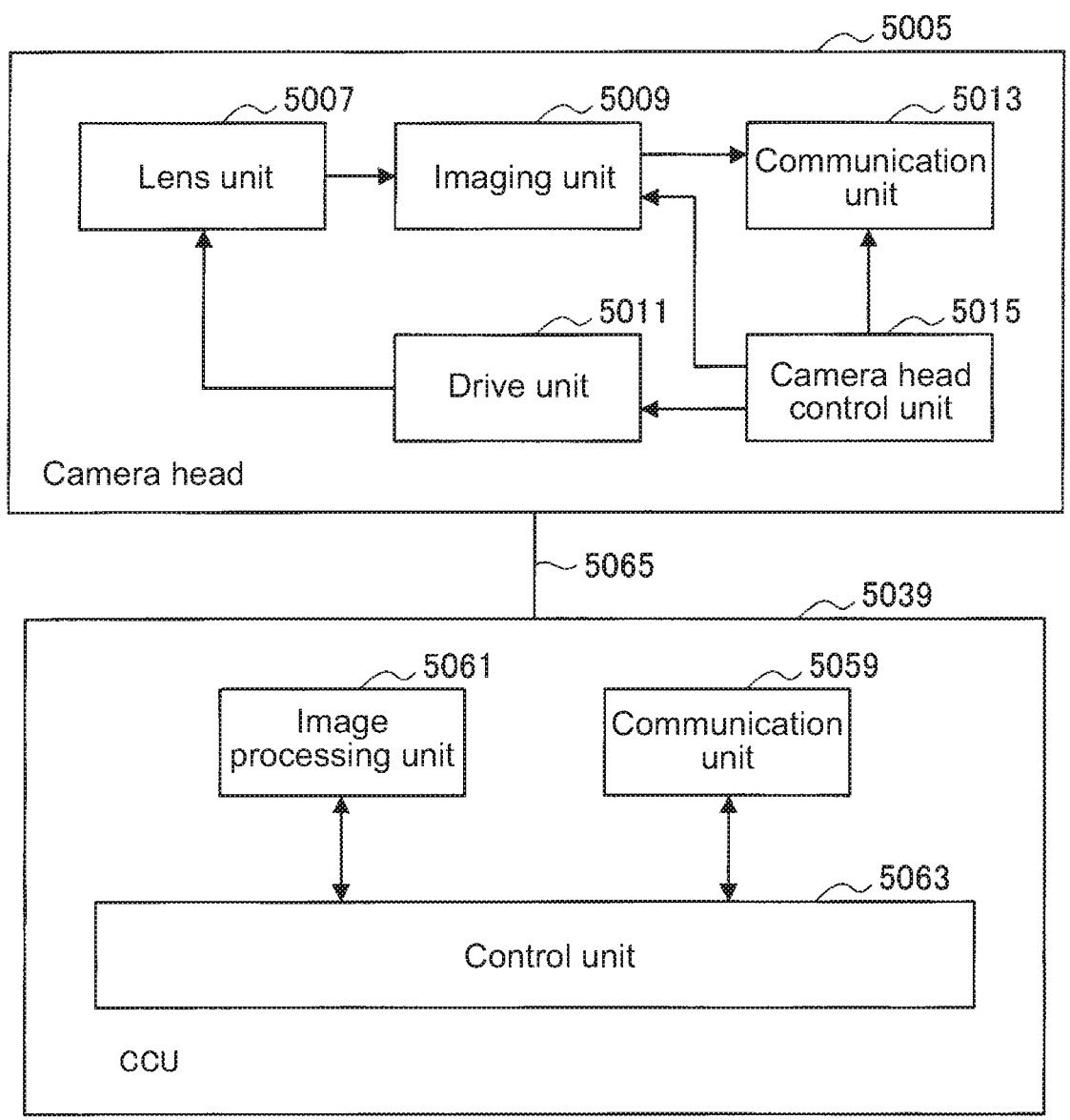
FIG. 11 is a block diagram illustrating an example of a functional configuration of a camera head and a CCU illustrated in FIG. 10.

The functions of the camera head 5005 and the CCU 5039 of the endoscope 5001 will be described below in more details with reference to FIG. 11. FIG. 11 is a block diagram illustrating an example of the functional configuration of the camera head 5005 and the CCU 5039 illustrated in FIG. 10.

Referring to FIG. 11, the camera head 5005 includes a lens unit 5007, an imaging unit 5009, a drive unit 5011, a communication unit 5013, and a camera head control unit 5015 as functional units thereof. In addition, the CCU 5039 includes a communication unit 5059, an image processing unit 5061, and a control unit 5063 as functional units thereof. The camera head 5005 and the CCU 5039 are connected to each other to perform bidirectional communication therebetween through a transmission cable 5065.

First, the functional configuration of the camera head 5005 will be described. The lens unit 5007 is an optical system that is provided in a connection portion to the lens-barrel 5003. Observation light supplied from the tip end of the lens-barrel 5003 is guided to the camera head 5005 and is incident on the lens unit 5007. The lens unit 5007 is constituted by combination of a plurality of lenses including a zoom lens and a focus lens. Optical characteristics of the lens unit 5007 are adjusted such that observation light is condensed to a light receiving surface of an imaging element of the imaging unit 5009. In addition, the zoom lens and the focus lens are constituted such that the positions on the optical axis thereof are movable to adjust the magnification and the focal point of a captured image.

The imaging unit 5009 is constituted by an imaging element and is disposed in the rear stage of the lens unit 5007. Observation light passing through the lens unit 5007 is condensed to the light receiving surface of the imaging element and an image signal corresponding to an observation image is generated by photoelectric conversion. The image signal generated by the imaging unit 5009 is supplied to the communication unit 5013.

For example, a complementary metal oxide semiconductor (CMOS) type image sensor with a Bayer array that can capture a color image is used as the imaging element constituting the imaging unit 5009. Note that, for example, an imaging element that can cope with image capturing with a high resolution of 4K or higher may be used as the imaging element. When an image of an operating site with a high resolution is acquired, the operator 5067 can understand the state of the operating site in more details and can more smoothly perform an operation.

In addition, the imaging element constituting the imaging unit 5009 is configured to have a pair of imaging elements for acquiring each of right-eye and left-eye image signals corresponding to 3D display. By performing 3D display, the operator 5067 can more accurately understand a depth of a biological tissue in an operating site. Note that, when the imaging unit 5009 is constituted in a multi-plate system, a plurality of lens units 5007 may be provided to correspond to the imaging elements.

In addition, the imaging unit 5009 may not be necessarily provided in the camera head 5005. For example, the imaging unit 5009 may be provided in the lens-barrel 5003 immediately after the objective lens.

The drive unit 5011 is constituted by an actuator and moves the zoom lens and the focus lens of the lens unit 5007 by a predetermined distance along an optical axis under the control of the camera head control unit 5015. Accordingly, the magnification and the focal point of a captured image which is captured by the imaging unit 5009 can be appropriately adjusted.

The communication unit 5013 is constituted by a communication device that transmits and receives various pieces of information to and from the CCU 5039. The communication unit 5013 transmits an image signal acquired from the imaging unit 5009 as RAW data to the CCU 5039 through the transmission cable 5065. At this time, it is desirable that the image signal is transmitted by optical communication to display a captured image of an operating site with low latency. This is because since an operator 5067 performs an operation while observing a state of an affected part using a captured image at the time of the operation, it is necessary to display a moving image of an operating site in real time for the purpose of a more safe and reliable operation. When optical communication is used, a photoelectric conversion module that converts an electrical signal into an optical signal is provided in the communication unit 5013. The image signal is converted into an optical signal by the photoelectric conversion module and then is transmitted to the CCU 5039 through the transmission cable 5065.

In addition, the communication unit 5013 receives a control signal for controlling driving of the camera head 5005 from the CCU 5039. The control signal includes, for example, information regarding imaging conditions such as information for designating a frame rate of a captured image, information for designating an exposure value at the time of imaging, and/or information for designating the magnification and the focal point of a captured image. The communication unit 5013 supplies the received control signal to the camera head control unit 5015. Note that, the control signal from the CCU 5039 may also be transmitted by optical communication. In this case, a photoelectric conversion module that converts an optical signal into an electrical signal is provided in the communication unit 5013. The control signal is converted into an electrical signal by the photoelectric conversion module and then is supplied to the camera head control unit 5015.

Note that, imaging conditions such as the frame rate, the exposure value, the magnification, and the focal point are automatically set by the control unit 5063 of the CCU 5039 on the basis of the acquired image signal. That is, a so-called auto exposure (AE) function, an auto focus (AF) function, and an auto white balance (AWB) function are mounted in the endoscope 5001.

The camera head control unit 5015 controls driving of the camera head 5005 on the basis of a control signal received from the CCU 5039 through the communication unit 5013. For example, the camera head control unit 5015 controls driving of the imaging element of the imaging unit 5009 on the basis of information for designating the frame rate of a captured image and/or information for designating exposure at the time of imaging. In addition, for example, the camera head control unit 5015 appropriately moves the zoom lens and the focus lens of the lens unit 5007 through the drive unit 5011 on the basis of information for designating the magnification and the focal point of a captured image. The camera head control unit 5015 may further have a function of storing information for identifying the lens-barrel 5003 or the camera head 5005.

Note that, when the configuration of the lens unit 5007 or the imaging unit 5009 is disposed in a sealed structure with high airtightness and waterproofness, the camera head 5005 can have resistance to autoclave sterilization.

Next, a functional configuration of the CCU 5039 will be described. The communication unit 5059 is constituted by a communication device that transmits and receives various pieces of information to and from the camera head 5005. The communication unit 5059 receives an image signal transmitted from the camera head 5005 through the transmission cable 5065. At this time, the image signal can be appropriately transmitted by optical communication as described above. In this case, a photoelectric conversion module that converts an optical signal into an electrical signal is provided in the communication unit 5059 to correspond to the optical communication. The communication unit 5059 supplies an electrical signal into which the image signal has been converted to the image processing unit 5061.

In addition, the communication unit 5059 transmits a control signal for controlling driving of the camera head 5005 to the camera head 5005. The control signal may also be transmitted by optical communication.

The image processing unit 5061 performs various image processing on an image signal which is RAW data transmitted from the camera head 5005. Examples of the image processing include various known signal processing such as development processing, image quality enhancing processing (such as band emphasizing processing, super-resolution processing, noise reduction (NR) processing, and/or camera shake correcting processing), and/or enlargement processing (an electronic zoom process). In addition, the image processing unit 5061 performs detection processing for an image signal for performing the AE function, the AF function, and the AWB function.

The image processing unit 5061 is constituted by a processor such as a CPU or a GPU, and the above-described image processing or the detection processing can be performed by allowing the processor to operate in accordance with a predetermined program. Note that, when the image processing unit 5061 is constituted by a plurality of GPUs, the image processing unit 5061 appropriately divides information associated with an image signal and performs image processing in parallel by the plurality of GPUs.

The control unit 5063 performs various controls for imaging an operating site using the endoscope 5001 and display of the captured image. For example, the control unit 5063 generates a control signal for controlling driving of the camera head 5005. At this time, when imaging conditions are input by a user, the control unit 5063 generates a control signal on the basis of the input by the user. Alternatively, when the AE function, the AF function, and the AWB function are mounted in the endoscope 5001, the control unit 5063 appropriately calculates an optimal exposure value, an optimal focal length, and a white balance on the basis of the result of the detection processing in the image processing unit 5061, and generates a control signal.

In addition, the control unit 5063 displays an image of an operating site on the display device 5041 on the basis of an image signal subjected to image processing by the image processing unit 5061. At this time, the control unit 5063 recognizes various objects in the image of the operating site using various image recognition technologies. For example, the control unit 5063 can recognize an operating tool such as a forceps, a specific biological part, bleeding, mist at the time of use of the energy treatment tool 5021, or the like by detecting the shape, color, or the like of an edge of an object included in the image of the operating site. The control unit 5063 displays various pieces of operation assisting information to overlap the image of the operating site using the recognition result at the time of displaying the image of the operating site on the display device 5041. When the operation assisting information is displayed to overlap and is presented to the operator 5067, it is possible to more safely and reliably perform an operation.

The transmission cable 5065 that connects the camera head 5005 and the CCU 5039 to each other is an electrical signal cable corresponding to communication of an electrical signal, an optical fiber corresponding to optical communication, or a combined cable thereof.

Here, in the illustrated example, communication is performed in a wired manner using the transmission cable 5065, but communication between the camera head 5005 and the CCU 5039 may be performed in a wireless manner. When communication therebetween is performed in a wireless manner, the transmission cable 5065 does not need to be installed in an operation room and thus it is possible to solve a problem that movement of a medical staff in the operation room is hindered by the transmission cable 5065.

An example of the endoscopic operating system 5000 to which the technology according to the present disclosure can be applied has been described above. Note that, the endoscopic operating system 5000 has been described herein as an example, but a system to which the technology according to the present disclosure can be applied is not limited to the example. For example, the technology according to the present disclosure may be applied to an examination flexible endoscope system or a microscope operating system.

The technology according to the present disclosure is appropriately applicable to the camera head 5005 made to be wireless among the above-described configurations. Specifically, in the case of being made to be wireless, a secondary battery may be provided inside a camera head to supply power to the camera head, and the technology related to the present disclosure is appropriately applicable to a portion of the secondary battery.

[7-2. Second Application Example]

The technology according to the present disclosure can be applied to various products. The technology according to the present disclosure may be realized, for example, as a device that is mounted on any one kind of moving body among an automobile, an electric vehicle, a hybrid electric vehicle, a motorcycle, a bicycle, a personal mobility, an airplane, a drone, a ship, a robot, a construction machine, an agricultural machine (tractor), and the like.

Figure 12:
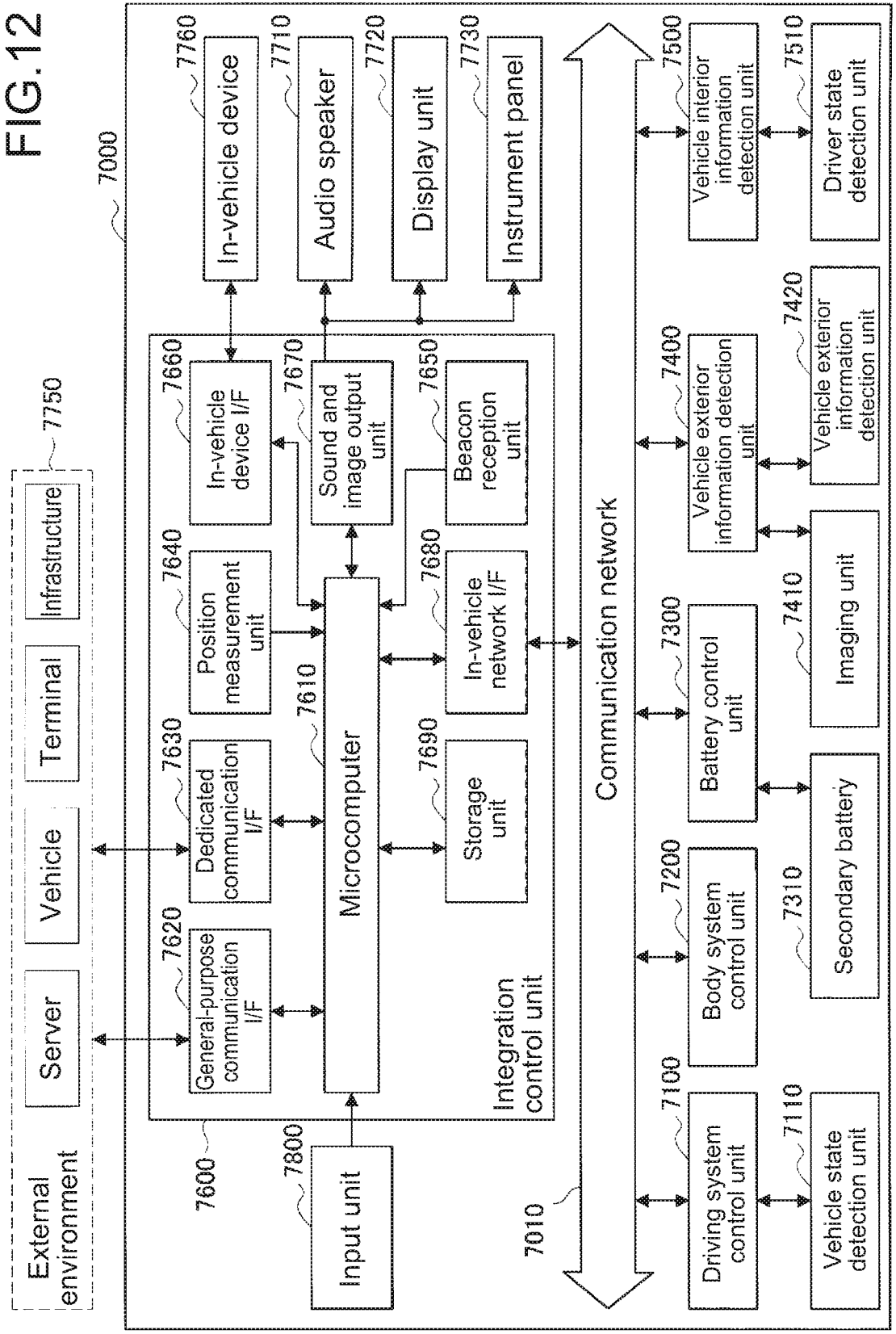
FIG. 12 is a block diagram illustrating an example of a schematic configuration of a vehicle control system.

FIG. 12 is a block diagram illustrating a schematic configuration example of a vehicle control system 7000 that is an example of a moving body control system to which the technology according to the disclosure is applicable. The vehicle control system 7000 includes a plurality of electronic control units which is connected to each other through a communication network 7010. In the example illustrated in FIG. 12, the vehicle control system 7000 includes a driving system control unit 7100, a body system control unit 7200, a battery control unit 7300, a vehicle exterior information detection unit 7400, a vehicle interior information detection unit 7500, and an integration control unit 7600. For example, the communication network 7010 that connects the plurality of control units to each other may be an on-vehicle communication network according to arbitrary standards such as a controller area network (CAN), a local interconnect network (LIN), a local area network (LAN), and FlexRay (registered trademark).

The respective control units include a microcomputer that performs operation processing in accordance with various programs, a storage unit that stores a program that is executed by the microcomputer, parameters capable of being used in various operations, and the like, and a drive circuit that drives devices of various control targets. Each of the respective control units includes a network I/F for performing communication with the other control units through the communication network 7010, and includes a communication I/F for performing communication with devices, sensors, and the like which are located on an inner side and on an outer side of a vehicle through wired communication or wireless communication. In FIG. 12, as a functional configuration of the integration control unit 7600, a microcomputer 7610, a general-purpose communication I/F 7620, a dedicated communication I/F 7630, a position measurement unit 7640, a beacon reception unit 7650, an in-vehicle device I/F 7660, a sound and image output unit 7670, an on-vehicle network I/F 7680, and a storage unit 7690 are illustrated in the drawing. Similarly, other control units also include a microcomputer, a communication I/F, a storage unit, and the like.

The driving system control unit 7100 controls an operation of devices related to a driving system of a vehicle in accordance with various programs. For example, the driving system control unit 7100 functions as a control device of a driving force generation device such as an internal combustion engine and a driving motor which generate a driving force of a vehicle, a driving force transmission mechanism that transmits the driving force to wheels, a steering mechanism that adjusts a steering angle of the vehicle, a braking device that generates a braking force of the vehicle, and the like. The driving system control unit 7100 may have a function as a control device of an antilock brake system (ABS), an electronic stability control (ESC), and the like.

A vehicle state detection unit 7110 is connected to the driving system control unit 7100. For example, the vehicle state detection unit 7110 includes at least one of a gyro sensor that detects an angular velocity of an axial rotary motion of a vehicle body, an acceleration sensor that detects an acceleration of the vehicle, and sensors which detect an operation amount of an accelerator pedal, an operation amount of a brake pedal, a steering angle of a steering wheel, the number of engine revolutions, a rotation speed of a wheel, and the like. The driving system control unit 7100 performs operation processing by using a signal that is input from the vehicle state detection unit 7110, and controls an internal combustion engine, a driving motor, an electric power steering device, a brake device, and the like.

The body system control unit 7200 controls an operation of various devices which are mounted on the vehicle body in accordance with various programs. For example, the body system control unit 7200 functions as a control device of a keyless entry system, a smart key system, a power window device, various lamps such as a head lamp, a back lamp, a brake lamp, a winker, and a fog lamp. In this case, an electric wave transmitted from a portable device that substitutes for a key, or signals of various switches may be input to the body system control unit 7200. The body system control unit 7200 receives input of the electric wave or the signals, and controls a door lock device, a power window device, the lamps, and the like of the vehicle.

The battery control unit 7300 controls a secondary battery 7310 that is a power supply source of the driving motor in accordance with various programs. For example, information such as a battery temperature, a battery output voltage, and a battery residual capacity is input from a battery device including the secondary battery 7310 to the battery control unit 7300. The battery control unit 7300 performs operation processing by using the signals, and performs temperature adjustment control of the secondary battery 7310, and control of a cooling device that is provided in the battery device.

The vehicle exterior information detection unit 7400 detects external information of the vehicle on which the vehicle control system 7000 is mounted. For example, at least one of an imaging unit 7410 and a vehicle exterior information detection unit 7420 is connected to the vehicle exterior information detection unit 7400. The imaging unit 7410 includes at least one among a time of flight (ToF) camera, a stereo camera, a monocular camera, an infrared camera, and other cameras. For example, the vehicle exterior information detection unit 7420 includes at least one among an environment sensor that detects current weather or meteorological phenomena, and a nearby information detection sensor that detects other vehicles at the periphery of the vehicle on which the vehicle control system 7000 is mounted, obstacles, pedestrians, and the like.

For example, the environment sensor may be at least one among a raindrop sensor that detects rainy weather, a fog sensor that detects fog, a sunshine sensor that detects the degree of sunshine, and a snow sensor that detects snowfall. The nearby information detection sensor may be at least one among an ultrasonic sensor, a radar device, and a light detection and ranging, laser imaging detection and ranging (LIDAR) device. The imaging unit 7410 and the vehicle exterior information detection unit 7420 may be provided as an independent sensor or device, or as a device in which a plurality of sensors or devices is integrated.

Figure 13:
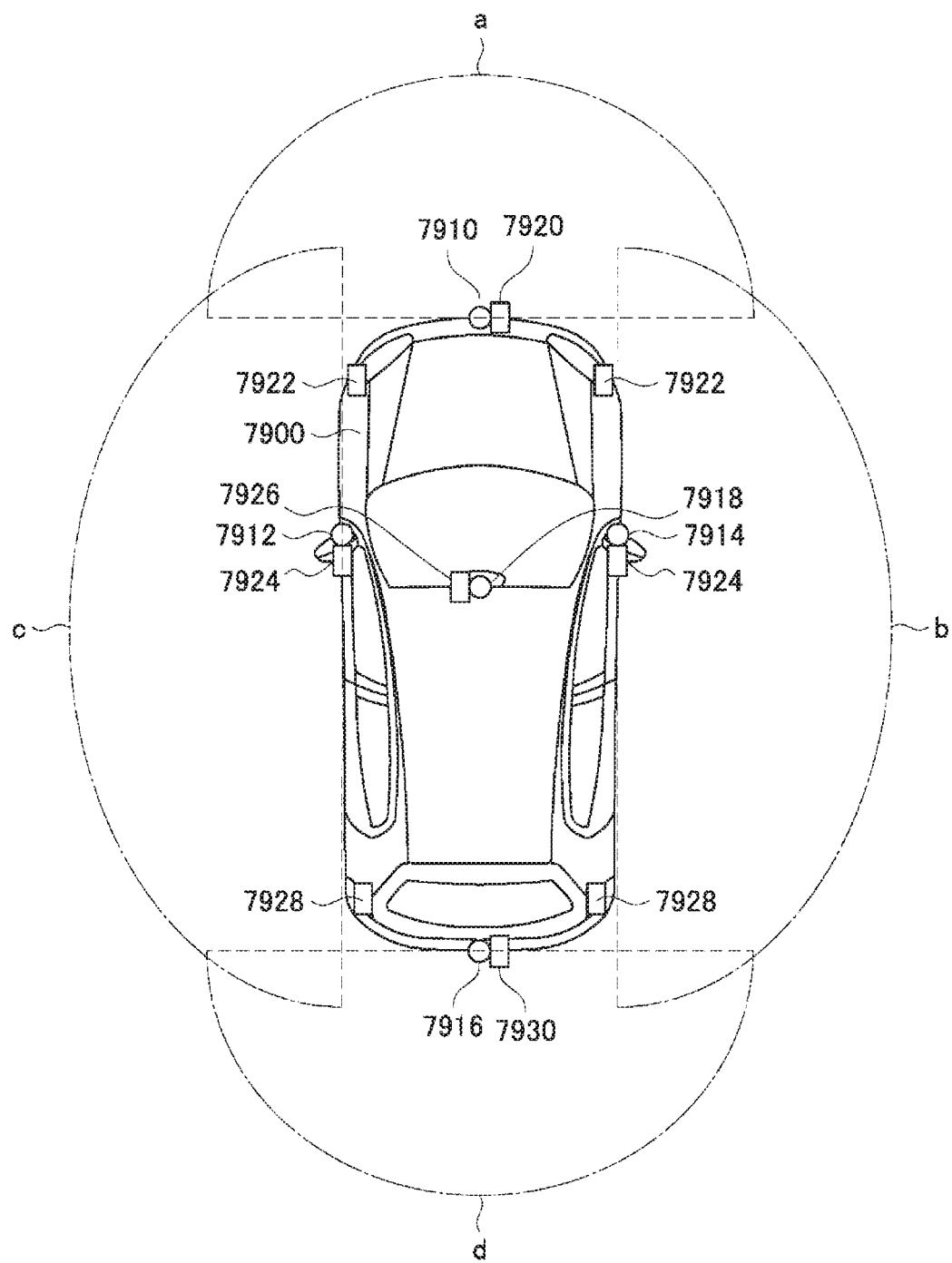
FIG. 13 is a view illustrating an example of an installation position of a vehicle exterior information detection unit and an imaging unit.

Here, FIG. 13 illustrates an example of an installation position of the imaging unit 7410 and the vehicle exterior information detection unit 7420. For example, each of imaging units 7910, 7912, 7914, 7916, and 7918 is provided at least at one position among a front nose, a side-view mirror, a rear bumper, a back door, and an upper portion of an in-vehicle windshield glass of a vehicle 7900. The imaging unit 7910 that is provided in the front nose, and the imaging unit 7918 that is provided in the upper portion of the in-vehicle windshield glass mainly acquire an image in front of the vehicle 7900. The imaging units 7912 and 7914 which are provided in the side-view mirrors mainly acquire an image on a lateral side of the vehicle 7900. The imaging unit 7916 that is provided in the rear bumper or the back door mainly acquires an image on a rear side of the vehicle 7900. The imaging unit 7918 that is provided on the upper portion of the in-vehicle windshield glass is mainly used for detection of a preceding vehicle, a pedestrian, an obstacle, a traffic signal, a traffic board, a lane, and the like.

Note that, FIG. 13 illustrates an example of an imaging range of the respective imaging units 7910, 7912, 7914, and 7916. An imaging range a represents an imaging range of the imaging unit 7910 that is provided in the front nose, imaging ranges b and c represent imaging ranges of the imaging units 7912 and 7914 which are provided in the side-view mirrors, and an imaging range d represents an imaging range of the imaging unit 7916 that is provided in the rear bumper or the back door. For example, when pieces of image data which are captured by the imaging units 7910, 7912, 7914, and 7916 overlap each other, an overhead view image when the vehicle 7900 is viewed from an upward side of the vehicle 7900 is obtained.

Vehicle exterior information detection units 7920, 7922, 7924, 7926, 7928, and 7930 which are provided in a front, a rear, sides, corners, and an upper portion of the in-vehicle windshield glass of the vehicle 7900 may be, for example, an ultrasonic sensor or a radar device. The vehicle exterior information detection units 7920, 7926, and 7930 which are provided in the front nose, the rear bumper, the back door, and an upper portion of the in-vehicle windshield glass of the vehicle 7900 may be, for example, the LIDAR device. The vehicle exterior information detection units 7920 to 7930 are mainly used for detection of a preceding vehicle, a pedestrian, an obstacle, and the like.

Description will continue with reference to FIG. 12. The vehicle exterior information detection unit 7400 causes the imaging unit 7410 to capture an out-of-vehicle image, and receives captured image data. In addition, the vehicle exterior information detection unit 7400 receives detection information from the vehicle exterior information detection unit 7420 that is connected to the vehicle exterior information detection unit 7400. In a case where the vehicle exterior information detection unit 7420 is the ultrasonic sensor, the radar device, or the LIDAR device, the vehicle exterior information detection unit 7400 transmits an ultrasonic wave, an electromagnetic wave, and the like, and receives information of a reflected wave that is received. The vehicle exterior information detection unit 7400 may perform object detection processing of a vehicle, an obstacle, a sign, a character on a road surface, and the like, or distance detection processing on the basis of received information. The vehicle exterior information detection unit 7400 may perform environment recognition processing of recognizing raindrop, fog, a road surface situation, and the like on the basis of the received information. The vehicle exterior information detection unit 7400 may calculate a distance to an out-of-vehicle object on the basis of the received information.

In addition, the vehicle exterior information detection unit 7400 may perform image recognition processing of recognizing a vehicle, an obstacle, a sign, a character on a load surface, and the like, or distance detection processing on the basis of received image data. The vehicle exterior information detection unit 7400 may perform processing such as distortion correction, alignment, and the like with respect to received image data, and may combine pieces of image data captured by the other imaging unit 7410 to generate an overhead view image or a panoramic image. The vehicle exterior information detection unit 7400 may perform visual point conversion processing by using image data captured by the other imaging unit 7410.

The vehicle interior information detection unit 7500 detects vehicle interior information. For example, a driver state detection unit 7510 that detects a driver state is connected to the vehicle interior information detection unit 7500. The driver state detection unit 7510 may include a camera that captures an image of a driver, a biological sensor that detects biological information of the driver, a microphone that collects an in-vehicle sound, and the like. For example, the biological sensor is provided on a seating surface, a steering wheel, and the like, and detects biological information of an occupant who sits on a seat, or a driver who grips the steering wheel. The vehicle interior information detection unit 7500 may calculate the degree of fatigue or the degree of concentration of the driver, or may determine whether or not the driver falls asleep on the basis of detection information that is input from the driver state detection unit 7510. The vehicle interior information detection unit 7500 may perform processing such as noise cancellation processing with respect to a sound signal that is collected.

The integration control unit 7600 controls whole operations in the vehicle control system 7000 in accordance with various programs. An input unit 7800 is connected to the integration control unit 7600. For example, the input unit 7800 is realized by devices such as a touch panel, a button, a microphone, a switch, and a lever which are subjected to input operation by an occupant. Data obtained through sound recognition of a sound that is input by the microphone may be input to the integration control unit 7600. For example, the input unit 7800 may be a remote control device using infrared rays or other electric waves, or an external connection device such as a portable telephone or a personal digital assistant which corresponds to an operation of the vehicle control system 7000. For example, the input unit 7800 may be a camera, and in this case, an occupant can input information with a gesture. Alternatively, data obtained by detecting movement of a wearable device which the occupant wears may be input. In addition, for example, the input unit 7800 may include an input control circuit that generates an input signal on the basis of information input by the occupant and the like by using the input unit 7800, and outputs the input signal to the integration control unit 7600, and the like. The occupant and the like operate the input unit 7800 to input various pieces of data to the vehicle control system 7000 or to instruct the vehicle control system 7000 to perform a processing operation.

The storage unit 7690 may include a read only memory (ROM) that stores various programs which are executed by the microcomputer, and a random access memory (RAM) that stores various parameters, operation results, sensor values, and the like. In addition, the storage unit 7690 may be realized by a magnetic storage device such as a hard disc drive (HDD), a semiconductor storage device, an optical storage device, a magneto-optical storage device, and the like.

The general-purpose communication I/F 7620 is a general-purpose communication I/F that relays communication with various devices which exist in an external environment 7750. In the general-purpose communication I/F 7620, a cellular communication protocol such as Global System of Mobile communication (GSM) (registered trademark), WiMAX (registered trademark), Long Term Evolution (LTE) (registered trademark), and LTE-Advanced (LET-A), and other wireless communication protocols such as a wireless LAN (also referred to as Wi-Fi (registered trademark)), and Bluetooth (registered trademark) may be embedded. For example, the general-purpose communication I/F 7620 may be connected to a device (for example, an application server or a control server) that exists on an external network (for example, the Internet, a cloud network, or a company-specific network) through a base station or an access point. In addition, the general-purpose communication I/F 7620 may be connected to a terminal that exists in the vicinity of a vehicle (for example, a terminal of a driver, a pedestrian, or a shop, or a machine type communication (MTC) terminal), for example, by using a peer to peer (P2P) technology.

The dedicated communication I/F 7630 is a communication I/F that supports a communication protocol that is designed for a use in a vehicle. In the dedicated communication I/F 7630, for example, a standard protocol such as a wireless access in vehicle environment (WAVE) that is a combination of IEEE 802.11p of a lower layer and IEEE1609 of a higher layer, dedicated short range communications (DSRC), and a cellular communication protocol may be embedded. Typically, the dedicated communication I/F 7630 performs V2X communication that is a concept including one or more among vehicle to vehicle communication, vehicle to infrastructure communication, vehicle to home communication, and vehicle to pedestrian communication.

For example, the position measurement unit 7640 executes position measurement by receiving a GNSS signal from a global navigation satellite system (GNSS) satellite (for example, a GPS signal from a global positioning system (GPS) satellite), and generates position information including a latitude, a longitude and an altitude of the vehicle. Note that, the position measurement unit 7640 may specify a current position through signal exchange with a wireless access point, or may acquire position information from a terminal such as a portable telephone, a PHS, or a smartphone which has a position measurement function.

For example, the beacon reception unit 7650 receives an electric wave or an electromagnetic wave which is transmitted from a wireless station that is provided on a road, and the like, and acquires information such as a current position, delay, closure to traffic, and a required time. Note that, a function of the beacon reception unit 7650 may be included in the dedicated communication I/F 7630.

The in-vehicle device I/F 7660 is a communication interface that relays connection between the microcomputer 7610 and various in-vehicle devices 7760. The in-vehicle device I/F 7660 may establish wireless connection by using a wireless communication protocol such as a wireless LAN, Bluetooth (registered trademark), near field communication (NFC), and a wireless USB (WUSB). In addition, the in-vehicle device I/F 7660 may establish wired connection such as a universal serial bus (USB), High-Definition Multimedia Interface (HDMI) (registered trademark), and a mobile high-definition link (MHL) through a connection terminal (and a cable as necessary) (not illustrated). For example, the in-vehicle devices 7760 may include at least one among mobile devices or wearable devices of occupants, and information devices which are conveyed into or mounted on a vehicle. In addition, the in-vehicle devices 7760 may include a navigation device that performs route searching to an arbitrary destination. The in-vehicle device I/F 7660 exchanges a control signal or a data signal with the in-vehicle devices 7760.

The on-vehicle network I/F 7680 is an interface that relays communication between the microcomputer 7610 and the communication network 7010. The on-vehicle network I/F 7680 transmits and receives a signal and the like on the basis of a predetermined protocol that is supported by the communication network 7010.

The microcomputer 7610 of the integration control unit 7600 controls the vehicle control system 7000 in accordance with various programs on the basis of information that is acquired through at least one among the general-purpose communication I/F 7620, the dedicated communication I/F 7630, the position measurement unit 7640, the beacon reception unit 7650, the in-vehicle device I/F 7660, and the on-vehicle network I/F 7680. For example, the microcomputer 7610 may calculate a control target value of the driving force generation device, the steering mechanism, or the braking device on the basis of acquired information on an inner side and on an outer side of a vehicle, and may output a control command with respect to the driving system control unit 7100. For example, the microcomputer 7610 may perform cooperative control to realize advanced driver assistance system (ADAS) functions including collision avoidance or impact mitigation of a vehicle, following travel based on an inter-vehicle distance, vehicle-speed maintaining travel, collision alarm of a vehicle, and vehicle lane departure alarm, and the like. In addition, the microcomputer 7610 may perform cooperative control to realize automatic driving and the like in which a vehicle autonomously travels without depending on a driver's operation by controlling the driving force generation device, the steering mechanism, the braking device, and the like on the basis of acquired nearby information of the vehicle.

The microcomputer 7610 may generate three-dimensional distance information between a vehicle and an object such as a nearby structure and a nearby person on the basis of information that is acquired through at least one among the general-purpose communication I/F 7620, the dedicated communication I/F 7630, the position measurement unit 7640, the beacon reception unit 7650, the in-vehicle device I/F 7660, and the on-vehicle network I/F 7680, and may create local map information including nearby information at a current position of the vehicle. In addition, the microcomputer 7610 may predict danger such as collision of the vehicle, approaching of a pedestrian and the like, and entrance into a road for which traffic is closed on the basis of acquired information, and may generate an alarm signal. For example, the alarm signal may be a signal for generating an alarm sound or a signal for lighting an alarm lamp.

The sound and image output unit 7670 transmits an output signal of at least one of a sound and an image to an output device capable of notifying an occupant of a vehicle or an outer side of the vehicle of information in a visual manner or an auditory manner. In the example in FIG. 12, as the output device, an audio speaker 7710, a display unit 7720, and an instrument panel 7730 are exemplified. For example, the display unit 7720 may include at least one of an on-board display and a head-up display. The display unit 7720 may have an augmented reality (AR) display function. The output device may other device such as a headphone, a wearable device such as an eyeglass-type display which the occupant wears, a projector, and a lamp in addition to the above-described devices. In a case where the output device is a display device, the display device visually displays results obtained through the various kinds of processing which are performed by the microcomputer 7610, or information received from other control units in various modes such as a text, an image, a table, and a graph. In addition, in a case where the output device is a sound output device, the sound output device converts an audio signal constituted by reproduced sound data, acoustic data, or the like into an analog signal, and outputs the analog signal in an auditory manner.

Note that, in the example illustrated in FIG. 12, at least two control units which are connected through the communication network 7010 may be integrated as one control unit. Alternatively, an individual control unit may be constituted by a plurality of control unit. In addition, the vehicle control system 7000 may include additional control units (not illustrated). In addition, in the description, a part or the entirety of a function of any one control unit may be provided in another control unit. That is, when transmission and reception of information through the communication network 7010 is established, predetermined operation processing may be performed by any one control unit. Similarly, a sensor or a device that is connected to any one control unit may be connected to another control unit, and a plurality of the control units may transmit and receive detection information to and from each other through the communication network 7010.

The technology according to the present disclosure is appropriately applicable to a portion of the secondary battery 7310 among the configurations of the above-described second application example.

<8. Present Technology>

Note that the present technology may also have the following structures.

(1) An electronic apparatus, including:

a battery mounting unit in which a secondary battery is mounted;

a charging unit that charges the secondary battery on the basis of external input power; and a connection unit that establishes electrical connection of an external device in which a secondary battery is mounted, in which the secondary battery mounted in the external device is charged by the charging unit through the connection unit.

(2) The electronic apparatus according to (1), further including:

a power receiving unit that receives power supply from the secondary battery mounted in the external device.

(3) The electronic apparatus according to (1) or (2), in which charging is performed with respect to the secondary battery mounted in the external device to be attachable and detachable by a user.

(4) The electronic apparatus according to any one of (1) to (3), in which the external device is capable of mounting a plurality of the secondary batteries therein, and charging is performed with respect to the plurality of secondary batteries by the charging unit.

(5) The electronic apparatus according to any one of (1) to (4), in which the secondary battery mounted in the battery mounting unit and the secondary battery mounted in the external device are selectively charged by the charging unit.

(6) The electronic apparatus according to any one of (1) to (5), in which each of the battery mounting unit and the external device is capable of mounting the secondary battery therein in an attachable and detachable manner, and the battery mounting unit is capable of mounting a secondary battery according to the same shape and the same size as in the secondary battery mounted in the external device.

(7) The electronic apparatus according to any one of (1) to (6), in which the electronic apparatus is set as an imaging apparatus from which the external device that functions as an extension grip is attachable and detachable.

(8) The electronic apparatus according to any one of (1) to (7), further including:

a charging control unit that controls a charging operation of the secondary battery by the charging unit, in which the charging control unit performs an authentication process relating to the secondary battery, and controls the charging operation on the basis of a result of the authentication process.

(9) The electronic apparatus according to any one of (1) to (8), further including:

a charging control unit that controls a charging operation of the secondary battery by the charging unit, in which in a case where a plurality of the secondary batteries exists as a charging target, the charging control unit causes the charging unit to execute charging preferentially from a secondary battery of which a charging rate is low.

(10) The electronic apparatus according to any one of (1) to (9), further including:

a charging control unit that controls a charging operation of the secondary battery by the charging unit, in which in a case where a plurality of the secondary batteries of which a charging rate is less than a predetermined charging rate less than full charging exists as a charging target secondary battery, in correspondence with charging of one secondary battery up to the predetermined charging rate, the charging control unit suspends charging of the secondary battery, and charges another secondary battery up to the predetermined charging rate.

(11) The electronic apparatus according to (10), in which the charging control unit initiates charging of the one secondary battery, in which charging is suspended, up to the full charging under a condition in which the charging rate of the other secondary battery becomes equal to or greater than the predetermined charging rate.

(12) The electronic apparatus according to any one of (1) to (11), further including:

a display unit that performs display with respect to information indicating a charging operation state of the charging unit.

(13) The electronic apparatus according to (12), further including:

a display control unit, in which the display unit includes a lighting tool, and the display control unit makes a lighting pattern of the lighting tool be different in correspondence with a type of the secondary battery that is being charging by the charging unit.

(14) The electronic apparatus according to (13), in which the display control unit makes the number of continuous flickers of a lighting pattern according to a first lighting time length of the lighting tool be different in correspondence with whether the secondary battery that is being charged by the charging unit is the secondary battery mounted in the battery mounting unit or the secondary battery mounted in the external device.

(15) The electronic apparatus according to (14), in which any one of the battery mounting unit and the external device is capable of mounting a plurality of the secondary batteries therein, and the display control unit makes the number of continuous flickers of a lighting pattern according to a second lighting time length of the lighting tool be different in correspondence with which of the plurality of secondary batteries is the secondary battery that is being charged by the charging unit.

(16) The electronic apparatus according to any one of (1) to (15), in which the connection unit establishes electrical connection of the external device by a terminal common to the secondary battery mounted in the battery mounting unit.

(17) The electronic apparatus according to any one of (1) to (15), in which the connection unit includes terminals for charging of the secondary battery mounted in the external device, and the terminals for charging are set as a terminal different from a terminal for charging of the secondary battery mounted in the battery mounting unit.

(18) The electronic apparatus according to any one of (1) to (17), in which, operation information of an operator provided in the external device is received through the connection unit.

REFERENCE SIGNS LIST 1, 1A electronic apparatus
1a battery mounting unit
1b grip portion
2, 2A external device
2a convex portion
2b fixing portion
2c operator
2d battery mounting unit
3A secondary battery (internal battery)
3B secondary battery (first external battery)
3C secondary battery (second external battery)
Tv power input terminal
Tga to Tgi ground terminal
Tca to Tci charging/power feeding terminal
Tda to Tdi data terminal
Tea, Tec switching signal terminal
11 charging unit
12, 12A connection unit
13 display unit
14 detection unit
15, 15A, 15B controller
16 power feeding unit
17, 21 switching unit

The invention claimed is:

1. An electronic apparatus, comprising:
a battery mounting unit in which a first secondary battery is mounted;
a charging unit configured to charge the first secondary battery based on external input power;
a connection unit configured to establish an electrical connection of an external device in which a second secondary battery is mounted,
   wherein the second secondary battery mounted in the external device is charged by the charging unit through the connection unit; and
a display unit that comprises a lighting tool, wherein the lighting tool is configured to:
   display a first lighting pattern when the first secondary battery mounted in the battery mounting unit is charged by the charging unit; and
   display a second lighting pattern when the second secondary battery mounted in the external device is charged by the charging unit, wherein the first lighting pattern and the second lighting pattern are different.

2. The electronic apparatus according to claim 1, further comprising:
a power receiving unit configured to receive power supply from the second secondary battery mounted in the external device.

3. The electronic apparatus according to claim 1, wherein the charging unit is further configured to charge the second secondary battery mounted in the external device to be attachable and detachable by a user.

4. The electronic apparatus according to claim 1, wherein the external device is configured to mount a plurality of the second secondary batteries therein, and
the charging unit is further configured to charge the plurality of second secondary batteries.

5. The electronic apparatus according to claim 1, wherein the first secondary battery mounted in the battery mounting unit and the second secondary battery mounted in the external device are selectively charged by the charging unit.

6. The electronic apparatus according to claim 1, wherein each of the battery mounting unit and the external device is configured to mount the first secondary battery and the second secondary battery, respectively, in an attachable and detachable manner, and
the first secondary battery has a same shape and a same size as that of the second secondary battery mounted in the external device.

7. The electronic apparatus according to claim 1, wherein the electronic apparatus is set as an imaging apparatus from which the external device that functions as an extension grip is attachable and detachable.

8. The electronic apparatus according to claim 1, further comprising a central processing unit (CPU) configured to:
control a charging operation of the second secondary battery by the charging unit;
perform an authentication process associated with the second secondary battery; and
control the charging operation based a result of the authentication process.

9. The electronic apparatus according to claim 1, further comprising a central processing unit (CPU) configured to:
control a charging operation of the second secondary battery by the charging unit; and
control, when a plurality of the second secondary batteries exists as a charging target, the charging unit to initiate preferentially charge from one secondary battery, of plurality of the second secondary batteries, for which a charging rate is lowest.

10. The electronic apparatus according to claim 1, further comprising a central processing unit (CPU) configured to:
control a first charging operation of the second secondary battery by the charging unit, wherein
when a plurality of the second secondary batteries of which a charging rate is less than a specific charging rate which is less than full charge exists as a charging target secondary battery, in correspondence with a second charging operation of a third secondary battery of the plurality of the second secondary batteries up to the specific charging rate;
suspend the third charging operation of the third secondary battery; and
charge a fourth secondary battery of the plurality of the second secondary batteries up to the specific charging rate.

11. The electronic apparatus according to claim 10, wherein
  the CPU is further configured to initiate the second charging operation of the third secondary battery, in which the second charging operation is suspended, up to the full charge under a condition in which the charging rate of the fourth secondary battery becomes equal to or greater than the specific charging rate.

12. The electronic apparatus according to claim 1, further comprising a central processing unit (CPU) configured to control the display unit to display:
  a first number of continuous flickers of the first lighting pattern according to a first lighting time length of the lighting tool when the first secondary battery mounted in the battery mounting unit charged by the charging unit, and
  a second number of continuous flickers of the second lighting pattern according to a second lighting time length of the lighting tool when the second secondary battery mounted in the external device is charged by the charging unit.

13. The electronic apparatus according to claim 1, further comprising a central processing unit (CPU) configured to control the display unit, wherein
  the battery mounting unit is configured to mount a plurality of the first secondary batteries,
  the external device is configured to mount a plurality of the second secondary batteries, and
  the CPU is further configured to control the display unit to:
    display a number of continuous flickers of the first lighting pattern according to a first lighting time length of the lighting tool based on a third secondary battery, of the plurality of first secondary batteries mounted in the battery mounting unit, charged by the charging unit; and
    display a number of continuous flickers of the second lighting pattern according to a second lighting time length of the lighting tool based on a fourth secondary battery, of the plurality of second secondary batteries mounted in the external device, charged by the charging unit.

14. The electronic apparatus according to claim 1, wherein the connection unit is further configured to establish the electrical connection of the external device by a terminal common to the second secondary battery mounted in the battery mounting unit.

15. The electronic apparatus according to claim 1, wherein
  the connection unit includes terminals for a charging operation of the second secondary battery mounted in the external device, and
  the terminals for the charging operation are different from a terminal for a charging operation of the secondary battery mounted in the battery mounting unit.

16. The electronic apparatus according to claim 1, wherein
  operation information of an operator provided in the external device is received through the connection unit.

17. An electronic apparatus, comprising:
  a battery mounting unit in which a first secondary battery is mounted;
  a connection unit configured to electrically connect to an imaging apparatus in which a second secondary battery is mounted, wherein
    the first secondary battery mounted in the battery mounting unit is charged by a charging unit that is provided in the imaging apparatus and charges the first secondary battery based on external input power through the connection unit; and
  a display unit that comprises a lighting tool, wherein the lighting tool is configured to:
    display a first lighting pattern when the first secondary battery mounted in the battery mounting unit is charged by the charging unit; and
    display a second lighting pattern when the second secondary battery is charged by the charging unit, wherein the first lighting pattern and the second lighting pattern are different.

* * * * *